US011797802B2

(12) United States Patent
Tsujita

(10) Patent No.: US 11,797,802 B2
(45) Date of Patent: Oct. 24, 2023

(54) APPARATUS, METHOD, AND STORAGE MEDIUM

(71) Applicant: CANON KABUSHIKI KAISHA, Tokyo (JP)

(72) Inventor: Kosuke Tsujita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/581,337

(22) Filed: Jan. 21, 2022

(65) Prior Publication Data

US 2022/0245410 A1 Aug. 4, 2022

(30) Foreign Application Priority Data

Jan. 29, 2021 (JP) ................................ 2021-012777

(51) Int. Cl.
*G06K 15/02* (2006.01)
*G03G 15/00* (2006.01)

(52) U.S. Cl.
CPC ....... *G06K 15/027* (2013.01); *G03G 15/5062* (2013.01); *G06K 15/1878* (2013.01)

(58) Field of Classification Search
CPC ......................... G06K 15/027; G06K 15/1878
USPC ....................................... 358/3.24, 1.15, 1.9
See application file for complete search history.

(56) References Cited

U.S. PATENT DOCUMENTS

2006/0119874 A1* 6/2006 Kurihara .............. H04N 1/6097 358/1.13
2022/0124222 A1* 4/2022 Kasahara ............. H04N 1/6033

FOREIGN PATENT DOCUMENTS

JP 2010122377 A 6/2010

* cited by examiner

*Primary Examiner* — Quang N Vo
(74) *Attorney, Agent, or Firm* — CANON U.S.A., INC. IP Division

(57) ABSTRACT

There is provided an apparatus including a forming unit configured to form an image on a sheet fed from a stage in response to execution of printing of a predetermined number of images based on a print job, a measurement unit configured to read the formed image and perform color measurement, a generation unit configured to generate data based on a result of the color measurement and a reference value, and a correction unit configured to perform a gradation correction to image data by using the generated data, wherein the sheet on which the image is formed is determined based on a setting of the print job.

15 Claims, 20 Drawing Sheets

910

JOB PROPERTY

JOB NAME: JOB C

JOB SETTING

| | |
|---|---|
| COLOR MODE | GRAYSCALE ~912 |
| SHEET TYPE | PLAIN PAPER 1 ~913 |
| SHEET SIZE | A4 ~914 |

MEDIA MIX SETTING ~915

| CATEGORY | COLOR MODE | SHEET TYPE | SHEET SIZE | |
|---|---|---|---|---|
| FRONT COVER | COLOR | THICK PAPER 2 | A3 | ~922 |
| PAGES: 3 - 11 | COLOR | THICK PAPER 2 | A4 | ~923 |

(919)

[ ADD ] 916   [ EDIT ] 917   [ DELETE ] 918

[ INTERRUPT ADJUSTMENT ] ~924

[ OK ]   [ CANCEL ]

MEDIA MIX SETTING — 931

JOB NAME: JOB C

● COVER PAGE SETTING — 932

☑ FRONT COVER (934)   ☐ BACK COVER (935)

| COLOR MODE | COLOR | — 936 |
| SHEET TYPE | THICK PAPER 2 | — 937 |
| SHEET SIZE | A3 | — 938 |

○ PAGE RANGE SETTING — 939

| PAGES | 3 - 11 | — 940 |
| COLOR MODE | COLOR | — 941 |
| SHEET TYPE | THICK PAPER 2 | — 942 |
| SHEET SIZE | A4 | — 943 |

[ SAVE ]   [ CANCEL ] — 946

961

CHANGE INTERRUPT CHART SETTING

JOB NAME: JOB C

CHANGE COLOR MODE

962 ● COLOR    963 ○ GRAYSCALE

CHANGE SHEET

| | SELECTED | SHEET TYPE | SHEET SIZE |
|---|---|---|---|
| 964 | ● | THICK PAPER 2 | A3 |
| 965 | ○ | PLAIN PAPER 1 | A4 |
| 966 | ○ | THICK PAPER 2 | A4 |

967

[ OK ]   [ CANCEL ]

| [1] JOB NAME | [2] CATEGORY | [3] COLOR MODE | [4] SHEET TYPE | [5] SHEET SIZE | |
|---|---|---|---|---|---|
| JOB A | PRINT JOB SETTING | COLOR | PLAIN PAPER 1 | A4 | [a] |
| JOB B | PRINT JOB SETTING | GRAYSCALE | PLAIN PAPER 1 | A4 | [b] |
| | MEDIA MIX (FRONT COVER) | GRAYSCALE | THICK PAPER 1 | A4 | [c] |
| JOB C | PRINT JOB SETTING | GRAYSCALE | PLAIN PAPER 1 | A4 | [d] |
| | MEDIA MIX (FRONT COVER) | COLOR | THICK PAPER 2 | A3 | [e] |
| | MEDIA MIX (PAGES: 3 - 11) | COLOR | THICK PAPER 2 | A4 | [f] |
| JOB D | PRINT JOB SETTING | GRAYSCALE | PLAIN PAPER 1 | A4 | [g] |
| | MEDIA MIX (FRONT COVER) | COLOR | THICK PAPER 3 | A4 | [h] |

| [1] JOB NAME | [2] COLOR MODE | [3] SHEET TYPE | [4] SHEET SIZE | |
|---|---|---|---|---|
| JOB A | COLOR | PLAIN PAPER 1 | A4 | [a] |
| JOB B | GRAYSCALE | THICK PAPER 1 | A3 | [b] |
| JOB C | COLOR | THICK PAPER 2 | A3 | [c] |
| JOB D | COLOR | THICK PAPER 2 | A4 | [d] |

| [1] SHEET FEED STAGE | [2] SHEET TYPE | [3] SHEET SIZE |
|---|---|---|
| 1 | PLAIN PAPER 1 | A4 |
| 2 | THICK PAPER 1 | A4 |
| 3 | THICK PAPER 1 | A3 |
| 4 | THICK PAPER 2 | A4 |
| 5 | PLAIN PAPER 1 | A3 |

FIG.13A

| REFERENCE VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

FIG.13B

| MEASUREMENT VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

FIG.13C

| CORRECTION VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 4 | 1 | -3 | -2 | -3 | -8 | 4 | 0 | 2 | 2 |
| M | 10 | 3 | 5 | -6 | 0 | -10 | -10 | -2 | -4 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

APPARATUS, METHOD, AND STORAGE MEDIUM

BACKGROUND

Field of the Disclosure

The aspect of the embodiments relates to an image forming apparatus, an image forming method, and a storage medium.

Description of the Related Art

An image forming apparatus configured to have a plurality of print modes in which image forming units can be switched between color printing and monochrome printing has been known. For example, when a certain number of monochrome image pages to be printed occur in succession, the image forming units of the image forming apparatus are switched to a monochrome image forming mode only capable of printing with black toner. Control of non-black toners and members such as photosensitive drums is suspended. Improved productivity and reduction of mechanical degradation can be expected from the switching of the print modes. On the other hand, it takes long time to switch the print modes because of changing the image forming units.

A printing system in which an inline sensor is connected to a subsequent stage of an image forming apparatus for forming an image on a sheet and the image formed by the image forming apparatus on the sheet is read using the inline sensor has also been known.

In such a printing system, adjustment results can be fed back to the image forming apparatus in real time even during printing of a job of a large number of pages by reading density adjustment patches printed by the image forming apparatus on a sheet using the inline sensor. In one embodiment, the patches are printed on the margins of an output products (sheet). However, the density adjustment patches are sometimes not able to be printed depending on the type or size of the sheet.

Japanese Patent Application Laid-Open No. 2010-122377 discusses a technique for generating an adjustment chart by printing patches on a sheet different from the output product of the print job, and printing an adjustment chart inserted when the number of printed pages reaches a predetermined number during the printing of the job. Japanese Patent Application Laid-Open No. 2010-122377 also discusses a technique for reading the densities of the patches on the printed adjustment chart and feeding back the densities to the image forming apparatus for density adjustment.

Japanese Patent Application Laid-Open No. 2010-122377 does not discuss the use of a plurality of types of sheets in a single print job. Which type of sheet to insert is therefore not able to be automatically set in inserting an adjustment chart in a print job in which a plurality of types of sheets is set.

SUMMARY OF THE DISCLOSURE

An apparatus includes a forming unit configured to form an image on a sheet fed from a stage in response to execution of printing of a predetermined number of images based on a print job, a measurement unit configured to read the formed image and perform color measurement, a generation unit configured to generate data based on a result of the color measurement and a reference value, and a correction unit configured to perform a gradation correction to image data by using the generated data, wherein the sheet on which the image is formed is determined based on a setting of the print job.

Further features of the disclosure will become apparent from the following description of exemplary embodiments with reference to the attached drawings.

BRIEF DESCRIPTION OF THE DRAWINGS

FIG. 10A is a diagram illustrating an example of a table for managing the attributes of print jobs.

FIG. 10B is a diagram illustrating an example of a table for managing color modes, sheet types, and sheet sizes of interrupt adjustment charts.

FIG. 11 is a diagram illustrating an example of a table for managing information about the sheet types and sheet sizes of sheets set in sheet feed stages of the image forming apparatus.

FIG. 13A is a diagram illustrating an example of reference value data, FIG. 13B is a diagram illustrating an example of measurement value data, and FIG. 13C is a diagram illustrating examples of correction values.

DESCRIPTION OF THE EMBODIMENTS

Exemplary embodiments of the disclosure will be described below with reference to the drawings.

<Configuration of Printing System>

Figure 1A:
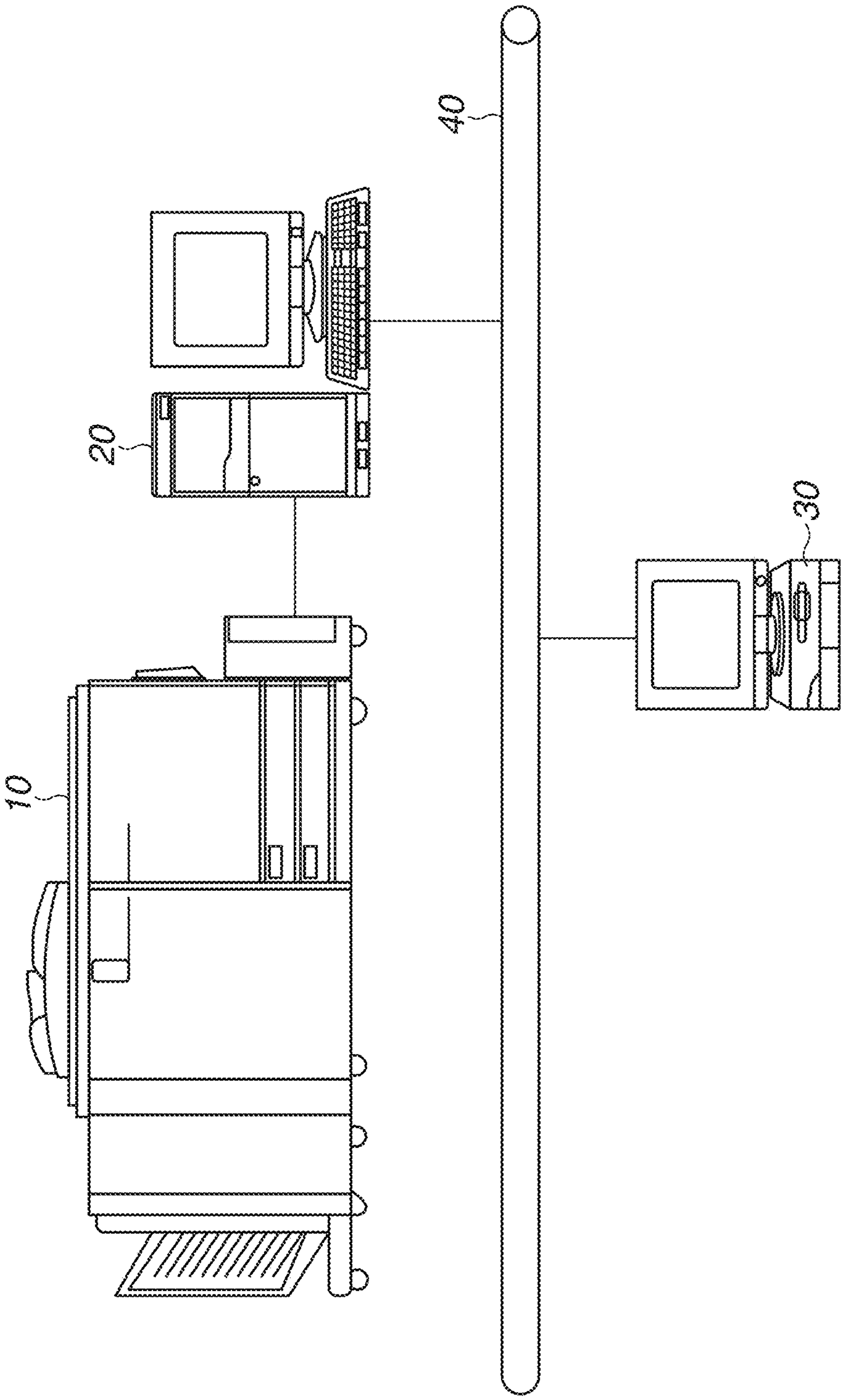
FIG. 1A is a diagram illustrating an example of a configuration of a printing system.
Figure 1B:
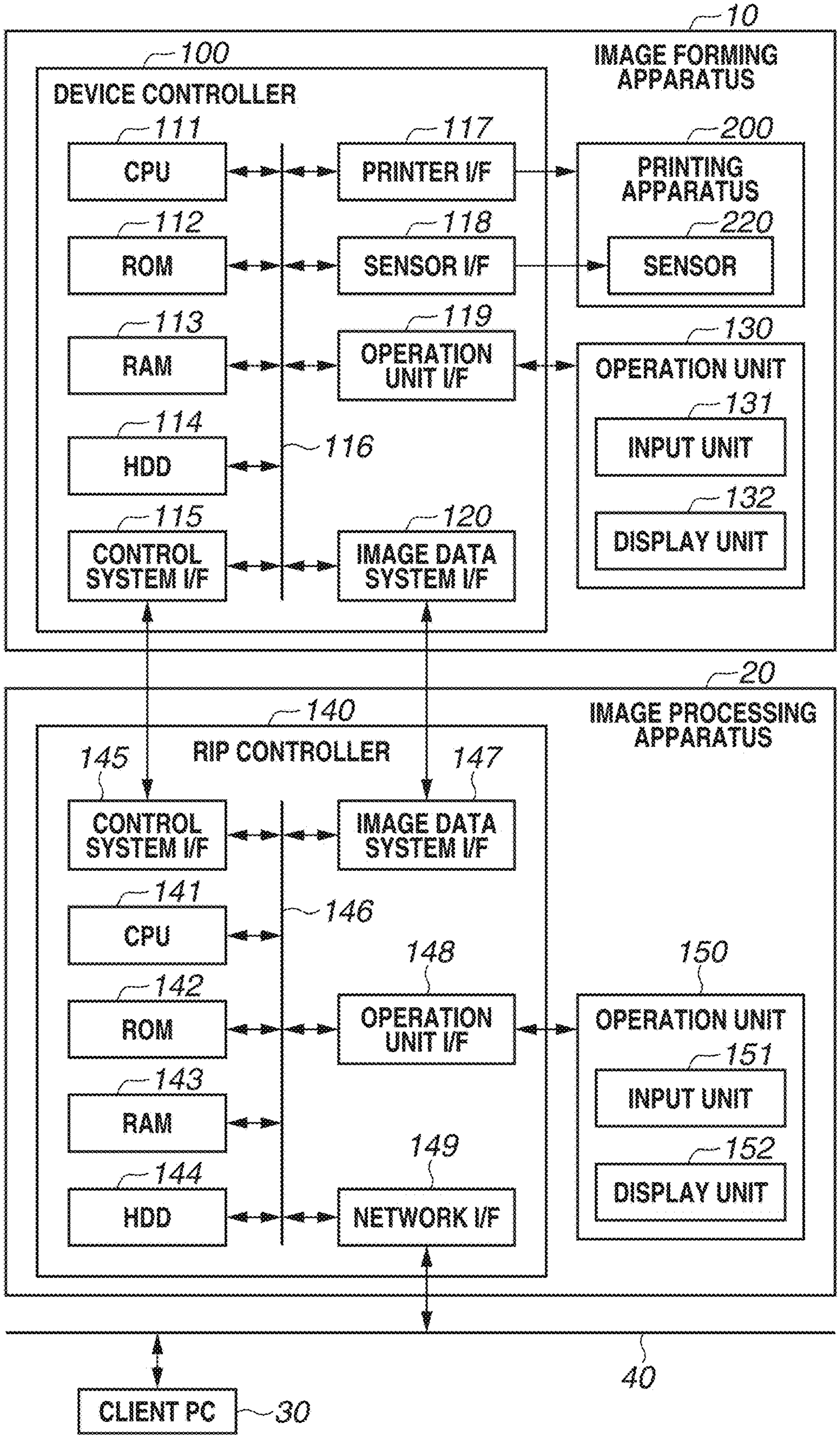
FIG. 1B is a block diagram illustrating an example of a hardware configuration of the printing system.

FIGS. 1A and 1B are diagrams illustrating an example of a configuration of a printing system according to an exemplary embodiment. As illustrated in FIG. 1A, the printing system includes an image forming apparatus 10, an image processing apparatus 20 connected to the image forming apparatus 10, and a client personal computer (PC) 30. The image processing apparatus 20 and the client PC 30 are connected via a network 40 such as a local area network (LAN). The image forming apparatus 10 and the image processing apparatus 20 have a function (print function) of forming an image on a recording medium such as a sheet of paper and a plastic sheet (hereinafter, referred to as "sheet") based on a print request received from the client PC 30.

The configuration of the printing system is not limited to that illustrated in FIG. 1A. At least one client PC 30 may be communicably connected to the image forming apparatus 10 and the image processing apparatus 20 via the network 40.

The image processing apparatus 20 may be configured as a print server independent from the image forming apparatus 10 as illustrated in FIGS. 1A and 1B. The system may be integrally formed by the image processing apparatus 20 and the image forming apparatus 10 to have the same functions as those of the image processing apparatus 20 and the image forming apparatus 10.

The network 40 may be a wired network or a wireless network.

<Hardware Configuration of Printing System>

FIG. 1B is a block diagram illustrating a hardware configuration of the printing system according to the present exemplary embodiment. The image forming apparatus 10 includes a device controller 100 that is a controller for controlling the devices of the image forming apparatus 10. A central processing unit (CPU) 111 integrally controls access to/from various devices connected to a system bus 116 based on a control program stored in a read-only memory (ROM) 112 or a hard disk drive (HDD) 114.

The ROM 112 stores control programs executable by the CPU 111. A random access memory (RAM) 113 functions mainly as a main memory and a work area of the CPU 111, and is configured to be capable of extending its memory capacity by an optional RAM connected to a not-illustrated extension port. The HDD 114 stores a boot program, various applications, font data, user files, and edit files. While the HDD 114 is used in the present exemplary embodiment, a Secure Digital (SD) card or a flash memory may be used as an external storage device in addition to the HDD 114.

A control system interface (I/F) 115 transmits to and receives from the image processing apparatus 20 information for use in print control.

A printer I/F 117 controls image output to a printing apparatus 200. An operation unit I/F 119 controls display on a display unit 132 included in an operation unit 130 and input of various types of setting information set using an input unit 131. An image data system I/F 120 receives image data to be transmitted to the printing apparatus 200 from the image processing apparatus 20.

A sensor I/F 118 transmits operation instructions to sensors 220 included in the printing apparatus 200 and receives measurement results from the sensors 220. The sensors 220 are arranged on a sheet conveyance path of the printing apparatus 200, between a fixing device and a sheet discharge port. Alternatively, the sensors 220 may be arranged on a sheet conveyance path of a not-illustrated finishing apparatus connected to a subsequence stage of the printing apparatus 200. An adjustment chart on which color patches are arranged based on the installation positions of the sensors 220 is printed and passed over the sensors 220, whereby the sensors 220 measure information about the color patches, such as spectral values, chromatic values, and densities. The measured information is used for the adjustment functions of both the image forming apparatus 10 and the image processing apparatus 20.

The image processing apparatus 20 includes a raster image processing (RIP) controller 140 that performs processing for the image processing apparatus 20 to perform printing, including analysis of a submitted print job and image data development processing. A CPU 141 integrally controls access to/from various devices connected to a system bus 146 based on a control program stored in a ROM 142 or an HDD 144.

The ROM 142 stores control programs executable by the CPU 141. A RAM 143 functions mainly as a main memory and a work area of the CPU 141, and is configured to be capable of extending its memory capacity by an optional RAM connected to a not-illustrated extension port. The HDD 114 stores a boot program, various applications, font data, user files, and edit files. While the HDD 144 is used in the present exemplary embodiment, an SD card or a flash memory may be used as an external storage medium in addition to the HDD 144.

A control system I/F 145 transmits to and receives from the image forming apparatus 10 information for use in print control. An image data system I/F 147 transmits image data to be output by the printing apparatus 200 to the image forming apparatus 10. An operation unit I/F 148 controls display on a display unit 152 included in an operation unit 150 and input of various types of setting information set using an input unit 151. A network I/F 149 performs data communication with the network (external network) 40 via a network cable.

The image processing apparatus 20 may also have a function of submitting a print job, like the client PC 30 to be described below. A print job is submitted from the operation unit 150 to the RIP controller 140 via a printer driver or a print management application.

The client PC 30 is connected to the image processing apparatus 20 via the external network 40. The client PC 30 submits a print job to the image processing apparatus 20 via a printer driver or a print management application.

<Internal Structure of Printing System>

Figure 2:
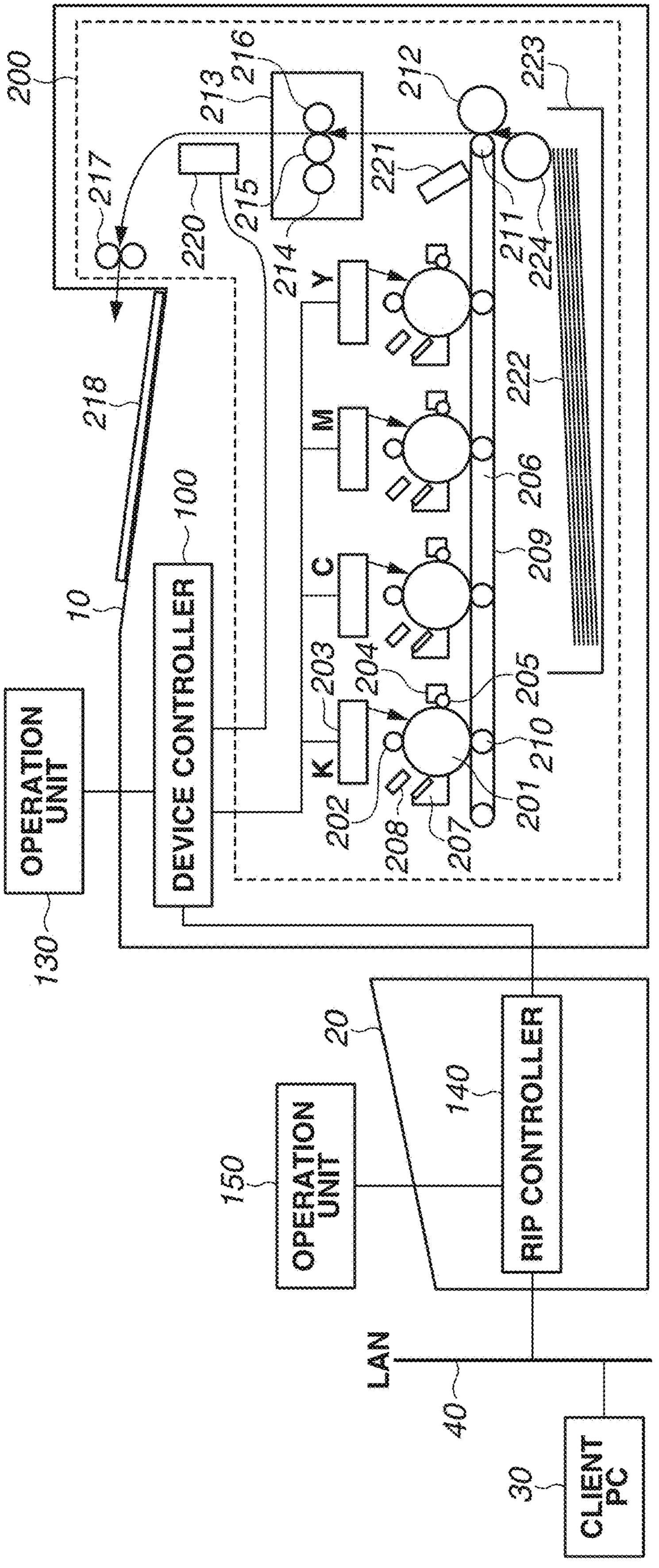
FIG. 2 is a diagram illustrating an internal configuration of the printing system.

FIG. 2 is a diagram illustrating an internal structure of the electrophotographic printing apparatus 200 included in the image forming apparatus 10 and a relationship between the apparatuses according to the present exemplary embodiment.

In FIG. 2, the portion surrounded by the dotted lines represents the printing apparatus 200. The printing apparatus 200 includes four stations corresponding to respective toners of cyan (C), magenta (M), yellow (Y), and black (K). The horizontally arranged four stations successively form toner images in order of yellow, magenta, cyan, and black.

Each station includes a photosensitive drum 201 serving as an image bearing member.

A charging device 202, an exposure device 203, a developing device 204, a cleaning device 207, and a pre-exposure device 208 are arranged around the peripheral surface of the photosensitive drum 201. The developing device 204 includes a developing roller 205 for supplying developer (toner) to the photosensitive drum 201. An intermediate transfer unit 206 includes an intermediate transfer belt 209 and primary transfer rollers 210 of the respective stations. The primary transfer rollers 210 are opposed to and make contact with the photosensitive drums 201 with the intermediate transfer belt 209 therebetween.

A secondary transfer inner roller 211 and a secondary transfer roller 212 are also arranged to make contact with each other with the intermediate transfer belt 209 therebetween so that the intermediate transfer belt 209 is rotated in a conveyance direction. A fixing device 213 includes a heating film (heating rotator) 214, a fixing roller 215, and a pressure roller 216, and fixes toner transferred to a sheet 222 by application of heat and pressure. A discharge roller 217 discharges the sheet 222 that has passed through the fixing device 213 to a discharge tray 218.

The sensors 220 are installed between the fixing device 213 and the discharge roller 217 so as to be able to read a print side of the sheet 222. The sensors 220 measure the densities of patches formed on the fixed sheet 222 and notifies the device controller 100 of the resulting color measurement data (density data). A cleaning blade 221 cleans remaining toner not transferred to the sheet 222 during the secondary transfer off the intermediate transfer belt 209. A sheet feed roller 224 feeds sheets 222 stored in a sheet feed stage 223.

In FIG. 2, the number of sheet feed stages 223 is one. However, the image forming apparatus 10 actually includes a plurality of sheet feed stages 223 corresponding to various sheet sizes and sheet types.

Next, software configurations of various apparatuses according to the present exemplary embodiment will be described.

<Software Configuration of Image Forming Apparatus>

Figure 3A:
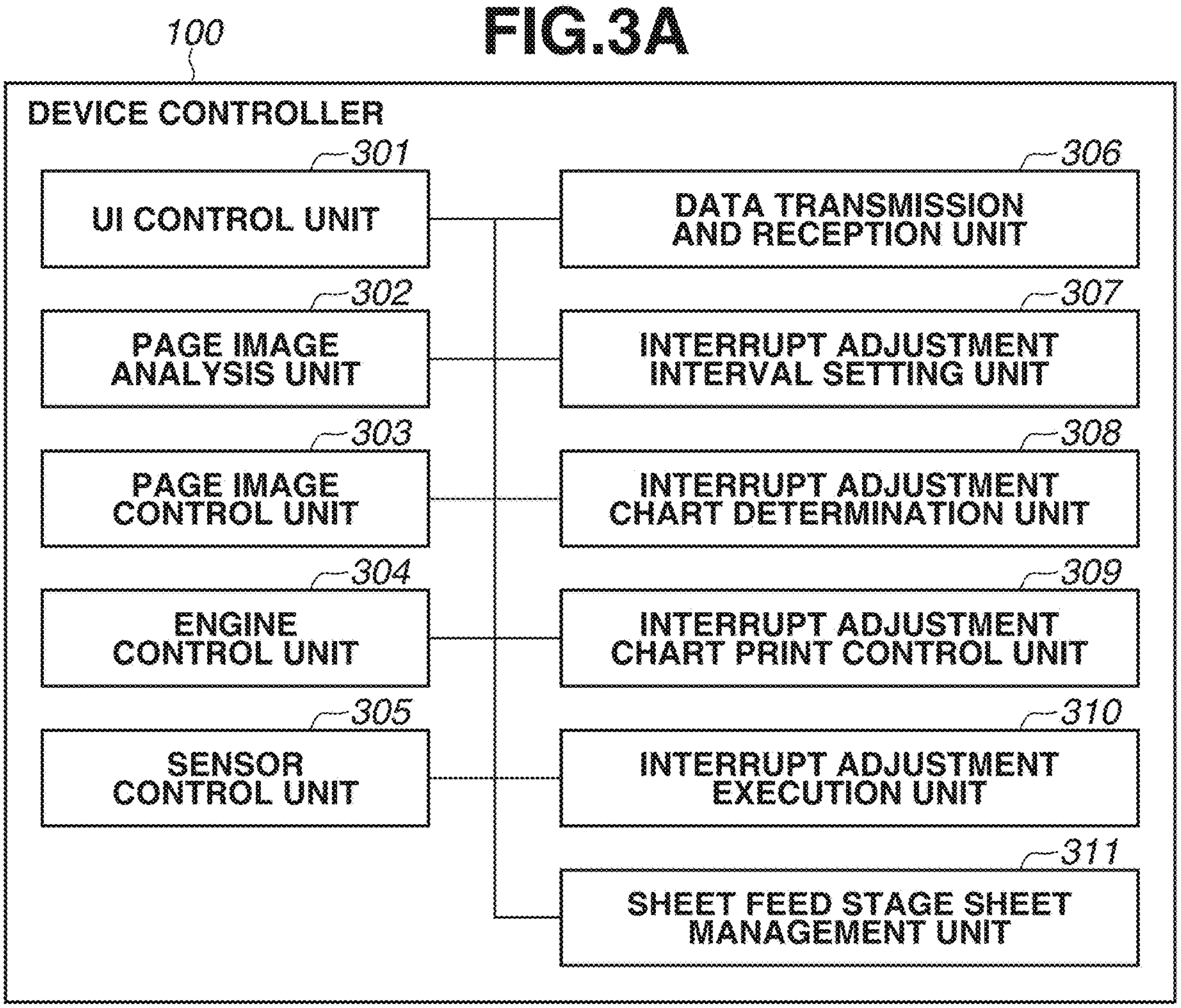
FIG. 3A is a block diagram illustrating an example of a software configuration of a device controller.

FIG. 3A is a block diagram of the device controller 100 including a software module configuration of the image forming apparatus 10. Such software modules are stored in the HDD 114 as programs, and read into the RAM 113 and executed by the CPU 111.

A user interface (UI) control unit 301 controls display on the display unit 132 of the operation unit 130 and input of various types of setting information set using the input unit 131 via the operation unit I/F 119.

A page image analysis unit 302 analyzes a print job received from the image processing apparatus 20. In the present exemplary embodiment, the page image analysis unit 302 determines whether an interrupt adjustment setting of the print job is enabled.

A page image control unit 303 performs print processing for the image forming apparatus 10 on the print job. The page image control unit 303 applies gradation correction processing and halftone processing to generate data printable by the printing apparatus 200.

An engine control unit 304 controls a series of print operations performed by the printing apparatus 200. A print job is processed and printed in units of pages.

A sensor control unit 305 controls the sensors 220 to measure the densities of patches formed on a printed sheet corresponding to a page for which a sensor measurement instruction is received, and obtains color measurement data (color measurement result).

A data transmission and reception unit 306 controls data transmission to and reception from the image processing apparatus 20. Examples of data to be transmitted and received include data of a print job and setting registration information stored in the image forming apparatus 10. The data transmission and reception unit 306 also notifies the image processing apparatus 20 of information about the sheet types and sheet sizes of sheets set in the respective sheet feed stages 223.

An interrupt adjustment interval setting unit 307 sets an interval of interrupt printing of adjustment charts (hereinafter, referred to as an interrupt adjustment interval).

<About UI Screen for Setting Interrupt Adjustment Interval>

Figure 8:
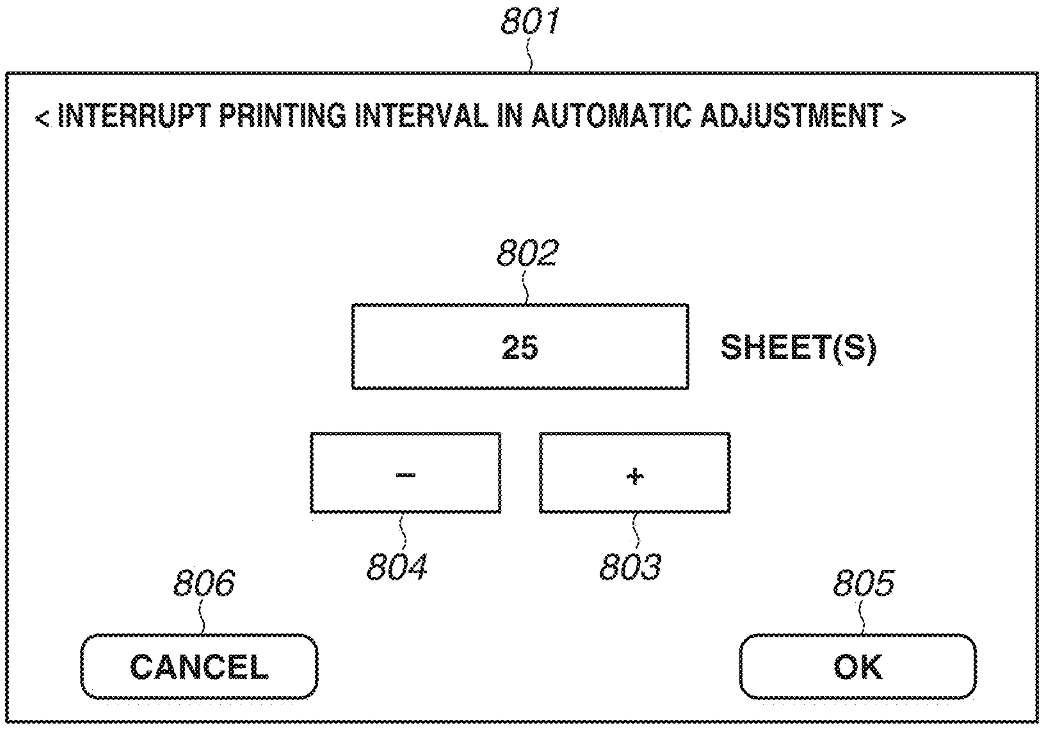
FIG. 8 is a diagram illustrating an example of a screen for setting an interrupt adjustment interval.

FIG. 8 illustrates an example of a UI screen for setting the interrupt adjustment interval according to the present exemplary embodiment. This UI screen 801 is generated by the interrupt adjustment interval setting unit 307 and displayed on the display unit 132 via the UI control unit 301.

A field 802 indicates interval information about the interval to print adjustment charts for making adjustments. The interval information is set by an operator via the input unit 131. Here, the number of sheets to be printed is specified as the interval information (interrupt interval information). While buttons 803 and 804 on this UI screen 801 are operated to accept a setting change, a UI that displays a numerical keypad and directly accepts a numerical value may be used. If the operator presses an OK button 805, the interrupt adjustment interval setting unit 307 notifies an interrupt adjustment chart print control unit 309 to be described below of the specified interval information, and terminates the UI screen 801. If a cancel button 806 is pressed, the interrupt adjustment interval setting unit 307 immediately terminates the UI screen 801.

An interrupt adjustment chart determination unit 308 determines a patch layout configuration of the adjustment chart to be inserted based on instructions from the image processing apparatus 20. Details thereof will be described below.

An interrupt adjustment chart print control unit 309 controls execution of interrupt printing. To print adjustment charts at specified intervals, the interrupt adjustment chart print control unit 309 performs processing regarding the printing of the adjustment chart, such as counting and clearing the number of printed pages and generating an adjustment chart image.

An interrupt adjustment execution unit 310 obtains color measurement data from the sensors 220 and calculates correction values for gradation correction. Then, the interrupt adjustment execution unit 310 updates gradation correction data based on the correction values.

A sheet feed stage sheet management unit 311 receives information (sheet information) about the sheet types and sheet sizes of the sheets set in the respective sheet feed stages 223 of the image forming apparatus 10, notified by a sheet feed stage sheet management unit 347 via a data transmission and reception unit 344 (see FIG. 3B), and manages the information.

<Software Configuration of Image Processing Apparatus>

Figure 3B:
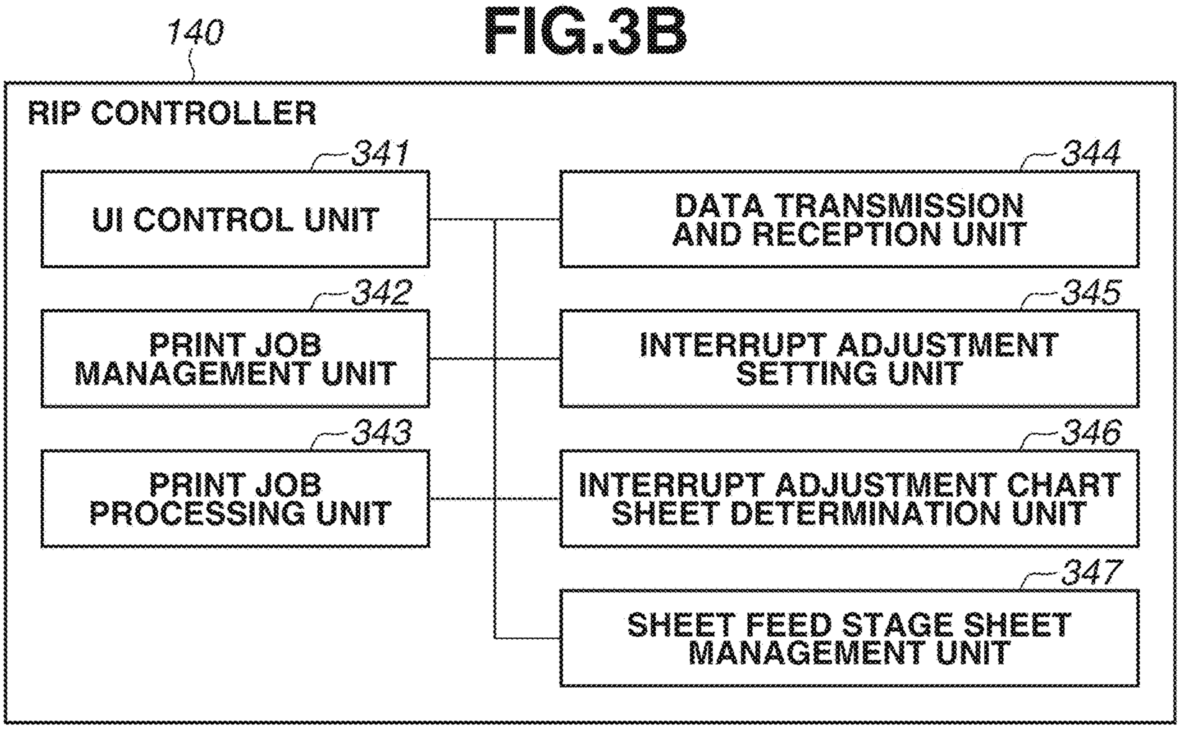
FIG. 3B is a block diagram illustrating an example of a software configuration of a raster image processing (RIP) controller.

FIG. 3B is a block diagram of the RIP controller 140 including a software module configuration of the image processing apparatus 20. Such software modules are stored in the HDD 144 as programs, and read into the RAM 143 and executed by the CPU 141.

An UI control unit 341 controls display on the display unit 152 of the operation unit 150 and input of various types of setting information set using the input unit 151 via the operation unit I/F 148.

A print job management unit 342 manages print job data accepted from the operator.

Specifically, the print job management unit 342 performs processing such as calling a print job stored in the HDD 144, reflecting a setting change made to the print job settings by the operator, and managing a history of printed jobs. There typically is a print management application for facilitating the operator's execution of a series of processes.

A print job processing unit 343 performs processing for executing print processing. Examples include analysis of a print job accepted from the operator, development into image data, and image compression and decompression.

The data transmission and reception unit 344 manages transmission and reception of various types of data to and from the image forming apparatus 10.

Print job data generated by the print job processing unit 343 is transmitted to the image forming apparatus 10 by the data transmission and reception unit 344. The data transmission and reception unit 344 also manages data transmission to and reception from the client PC 30 connected via the external network 40.

An interrupt adjustment setting unit 345 sets whether to make an interrupt adjustment to a print job. This setting is one of print setting items of the above-described print management application. The print setting items are displayed and set when a property button 904 (see FIG. 9A) is pressed.

An interrupt adjustment chart sheet determination unit 346 determines a sheet to be used as an adjustment chart (hereinafter, also referred to as an interrupt adjustment chart) based on the print settings if the setting to make an interrupt adjustment to the print job is made. Details thereof will be described below.

The sheet feed stage sheet management unit 347 manages the information about the sheet types and sheet sizes of the sheets set in the respective sheet feed stages 223 of the image forming apparatus 10 via the data transmission and reception unit 344.

<About Table for Managing Attributes of Print Jobs>

Now, setting items of print jobs displayed by the print management application will be described. FIG. 10A illustrates a table 1001 for managing the attributes of the print jobs. The table 1001 is stored in the HDD 144. The print job management unit 342 reads the print setting information about the print settings, and stores the print settings for each print job in the table 1001. Column [1] of the table 1001 stores job names Colum [2] defines whether the items in columns [3] to [5] are specified by print job setting or by a media mix. The print job setting and the media mix will be described below. Column [3] describes color modes. Column [4] describes sheet types. Column [5] describes sheet sizes.

<About UI Screen for Setting Attributes of Print Job>

FIGS. 9A, 9B, 9C, 9D, and 9E illustrate examples of UI screens of the print management application according to the present exemplary embodiment. This UI screen 901 is managed and generated by the print job management unit 342 and displayed on the display unit 152 via the UI control unit 341.

The job names (job A to job D) displayed on the UI screen 901 correspond to the respective job names listed in column [1] of the table 1001.

There are various print setting items. Examples include the print sheet to be used for the print job, layout such as imposition, and items about color and image processing. The print setting items set here are notified to the print job management unit 342. If a delete button 905 is pressed, the data on the selected print job is deleted from the job queue.

A job queue 902 displays information about print jobs received by the image processing apparatus 20. In the job queue 902, the names of the print jobs, the numbers of pages of the print jobs, information about the numbers of copies, and information about whether an interrupt adjustment to be described below is enabled are displayed. The information to be displayed is not limited thereto. For example, any of the items set for the print jobs may be displayed.

These setting items of the print jobs can be edited by the operator selecting a displayed job name and pressing the property button 904 on the UI screen 901. For example, suppose that the operator selects "job C" and presses the property button 904. In such a case, the UI control unit 341 instructs the print job management unit 342 to obtain job properties of the selected job C. Upon reception of the instruction, the print job management unit 342 accesses the table 1001 and obtains the values set for job C in rows [d] to [f] in FIG. 10A.

Then, the print job management unit 342 instructs the UI control unit 341 to display a job property screen 910 (see FIG. 9B) on the display unit 152. The job property screen 910 displays the print settings set for job C. More specifically, a field 912 displays "grayscale" set in column [3], row [d] in FIG. 10A. A field 913 displays "plain paper 1" set in column [4], row [d] of the table 1001 in FIG. 10A. A field 914 displays "A4" set in column [5], row [d] of the table 1001 in FIG. 10A. A section 915 displays media mix settings. A table 919 displays the content of the settings. The media mix refers to a function of specifying a cover page(s) and/or a page range(s) in a print job, and specifying a color mode, sheet type, and sheet size for each of the specified cover page(s) and/or page range(s).

A row 922 displays the values for "media mix (font cover)" listed in columns [3] to [5], row [e] of the table 1001 in FIG. 10A. A row 923 displays the values for "media mix (pages: 3-11)" listed in columns [3] to [5], row [f] of the table 1001 in FIG. 10A. The media mix settings can be added by the operator pressing an add button 916 on the job property screen 910. The rows 922 and 923 displayed in the table 919 can be edited by selecting a row and pressing an edit button 917.

Settings can be deleted by selecting the row 922 or 923 and pressing a delete button 918. An example of editing using the media mix will be described. If the operator selects the row 922 and presses the edit button 917, the UI control unit 341 notifies the print job management unit 342 thereof. In response, the print job management unit 342 obtains the print settings specified for "media mix (front cover)" of "job C" from columns [3] to [5], row [e] of the table 1001 in FIG. 10A. Then, the print job management unit 342 instructs the UI control unit 341 to display a media mix setting screen 931 in FIG. 9C on the display unit 152. The media mix setting screen 931 is a screen for making media mix settings. A radio button 932 on the media mix setting screen 931 is used to make a cover page setting.

A checkbox 934 is a checkbox for setting a front cover, and a checkbox 935 a checkbox for setting a back cover. In this example, the row 922 is selected and the edit button 917 is pressed on the job property screen 910 in FIG. 9B. The settings in the row 922 are based on the settings in row [e] of the table 1001 in FIG. 10A. Since the setting in column [2], row [e] is for "front cover", the radio button 932 for cover page setting and the checkbox 934 for a front cover are displayed in a checked state. Fields 936 to 938 display the print settings of the front cover. More specifically, the field 936 displays "color" set in column [3], row [e] of the table 1001 in FIG. 10A.

The field 937 displays "thick paper 2" set in column [4], row [e] of the table 1001 in FIG. 10A. The field 938 displays "A3" set in column [5], row [e] of the table 1001 in FIG. 10A. If the operator selects one of the display items 934 to 938, a not-illustrated selection screen is displayed and the operator can change the print setting. If the operator presses a save button 945, the UI control unit 341 notifies the print job management unit 342 thereof. The print job management unit 342 writes the print settings made using the display items 932 to 938 to the table 1001 in FIG. 10A, and instructs the UI control unit 341 to display the job property screen 910 on the display unit 152.

If the operator selects a cancel button 946 on the media mix setting screen 931, the UI control unit 341 notifies the print job management unit 342 thereof. The print job management unit 342 instructs the UI control unit 341 to display the job property screen 910 on the display unit 152 without writing the print settings made using the display items 934 to 938 to the table 1001.

If the operator selects the row 923 and presses the edit button 917 on the job property screen 910, the UI control unit 341 notifies the print job management unit 342 thereof. Then, the print job management unit 342 obtains the print settings specified for "media mix (pages: 3-11)" of "job C" from columns [3] to [5], row [f] of the table 1001 in FIG. 10A. Then, the print job management unit 342 instructs the UI control unit 341 to display the media mix setting screen 931 on the display unit 152.

Sections 940 to 943 on the media mix setting screen 931 are for making page range settings.

In this example, the row 923 is selected and the edit button 917 is pressed on the job property screen 910. The settings in the row 923 are based on those in row [f] of the table 1001 in FIG. 10A. Since the setting in column [2], row [f] represents page range specification, a radio button 939 for page range specification is displayed on. A field 940 displays the page range. The page range in column [2], row [f] of the table 1001 is "3-11", which is displayed in the field 940. Since the subsequent display items 941 to 943 are similar to the display items 936 to 938 described as the cover page setting, a description thereof will be omitted.

If the operator presses the save button 945, the UI control unit 341 notifies the print job management unit 342 thereof. The print job management unit 342 writes the print settings set using the display items 940 to 943 to the table 1001, and instructs the UI control unit 341 to display the job property screen 910 on the display unit 152. If the operator presses the cancel button 946 on the media mix setting screen 931, the UI control unit 341 notifies the print job management unit 342 thereof. The print job management unit 342 instructs the UI control unit 341 to display the job property screen 910 on the display unit 152 without writing the print settings made using in the display items 940 to 943 to the table 1001 in FIG. 10A.

If the operator presses the add button 916 on the job property screen 910, the UI control unit 341 notifies the print job management unit 342 thereof. In response, the print job management unit 342 instructs the UI control unit 341 to display the media mix setting screen 931 on the display unit 152. In this case, since a media mix setting is to be added, the media mix setting screen 931 is displayed with the radio button 932 for cover page setting checked, without a check or setting value in the other sections. While the media mix setting screen 931 is described, because of the characteristics of radio buttons, to be displayed with the radio button 932 for cover page setting checked, the media mix setting screen 931 may be displayed with the radio button 939 for page range setting checked.

The operator can set a new cover page or a new page range by operating the media mix setting screen 931. If the operator selects the row 922 on the job property screen 910 and presses the delete button 918, the UI control unit 341 notifies the print job management unit 342 thereof. In response, the print job management unit 342 deletes row [f] of the table 1001 where the print settings specified for "media mix (front cover)" of "job C" are stored. If the operator presses an interrupt adjustment button 924 on the job property screen 910, an interrupt adjustment setting screen for job C is opened. Details thereof will be described below.

Figure 9A:
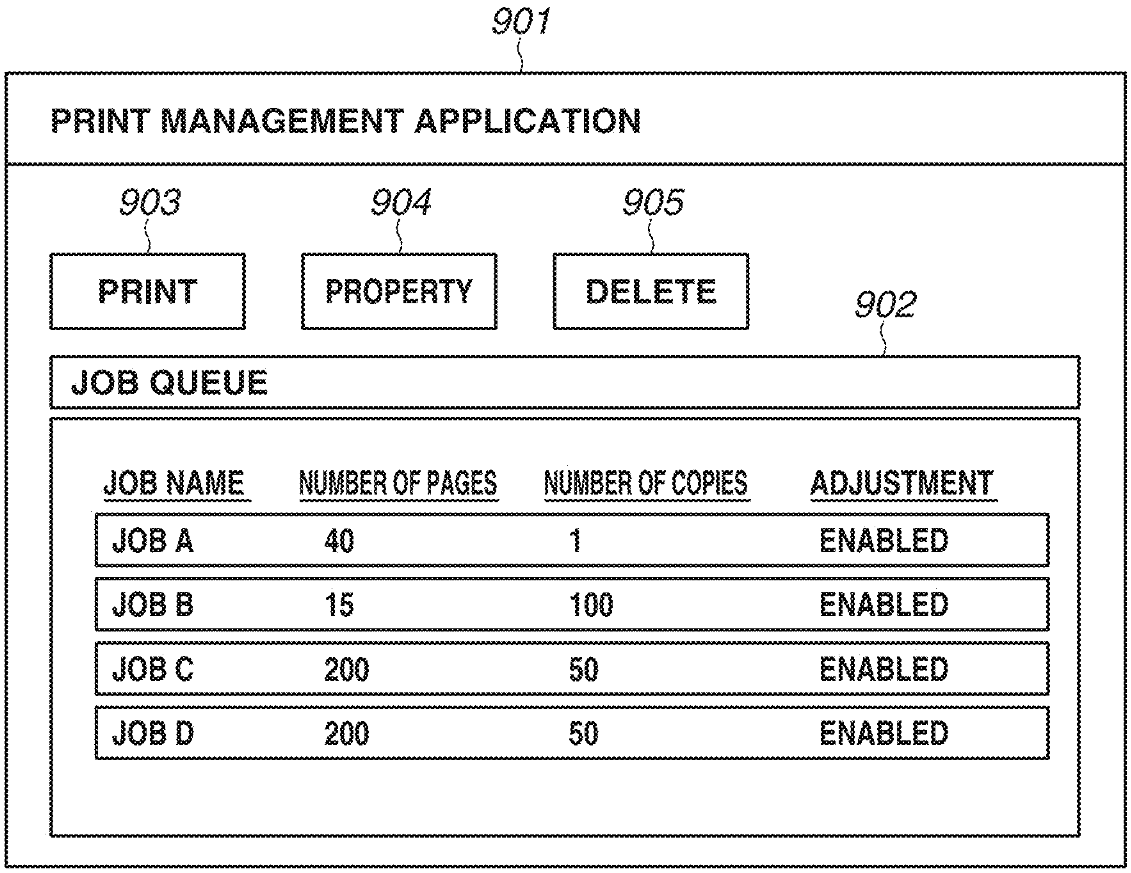
FIGS. 9A, 9B, 9C, 9D, and 9E are diagrams illustrating examples of screens of a print management application.
Figure 9B:
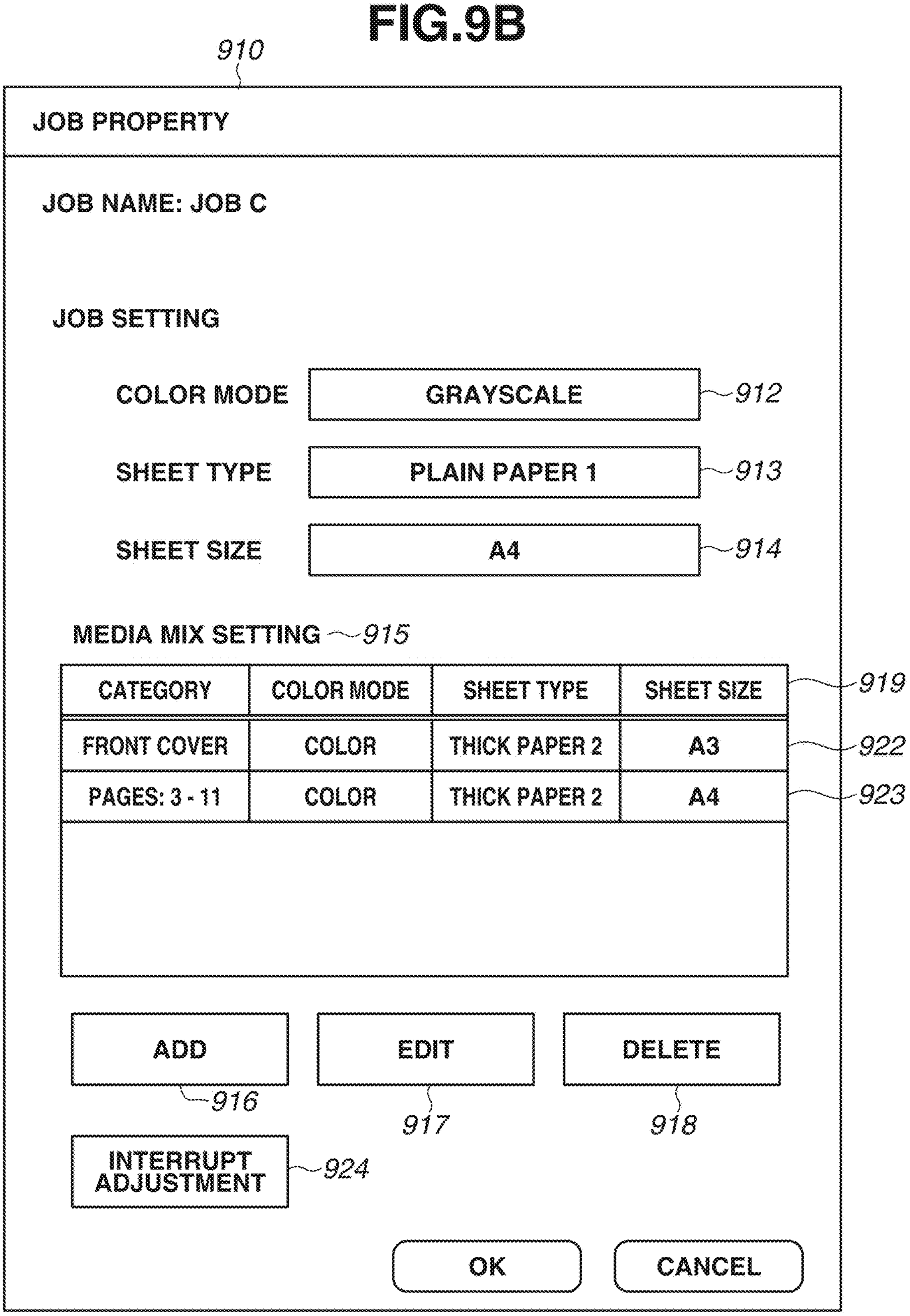
Figure 9C:
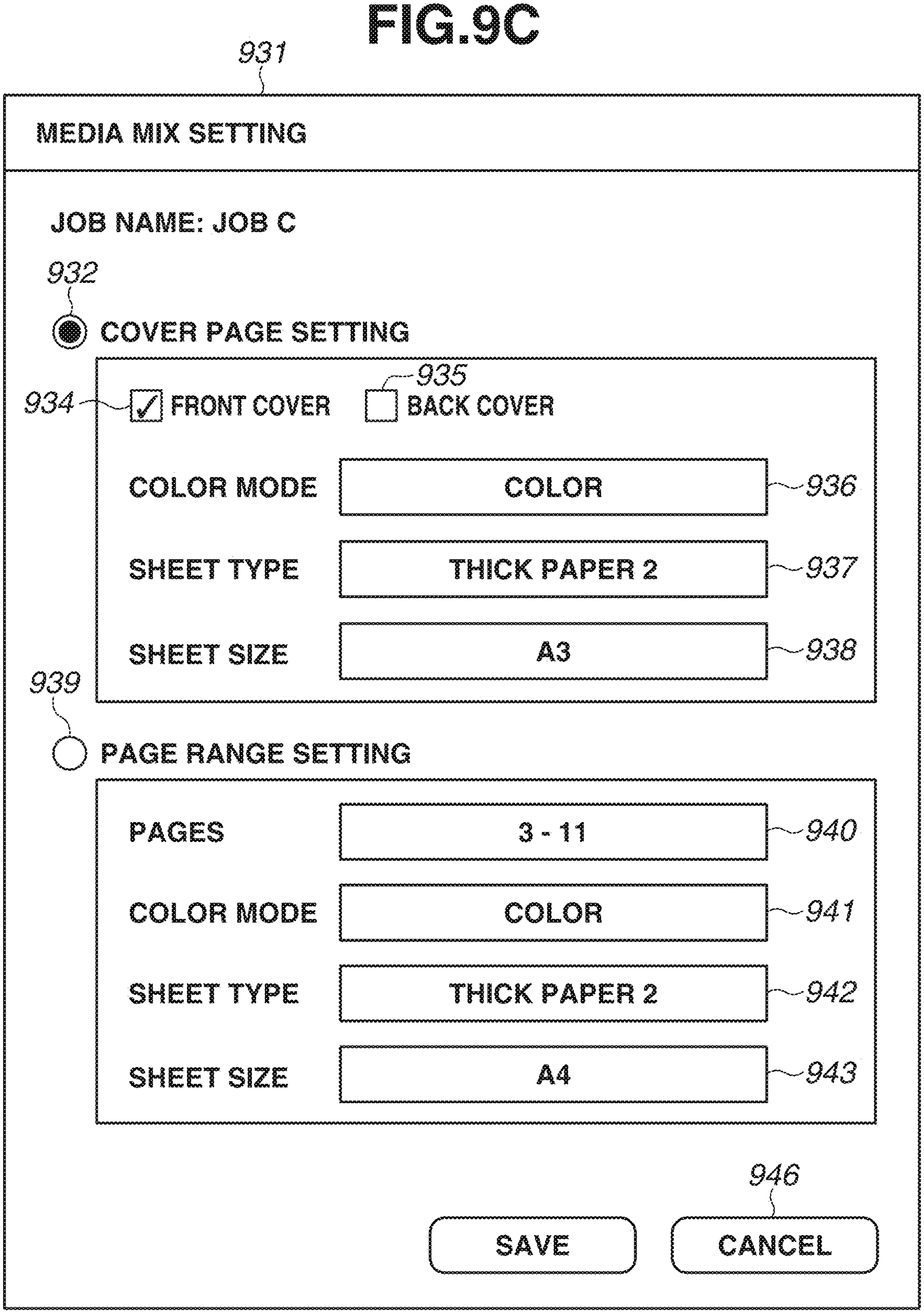
Figure 9D:
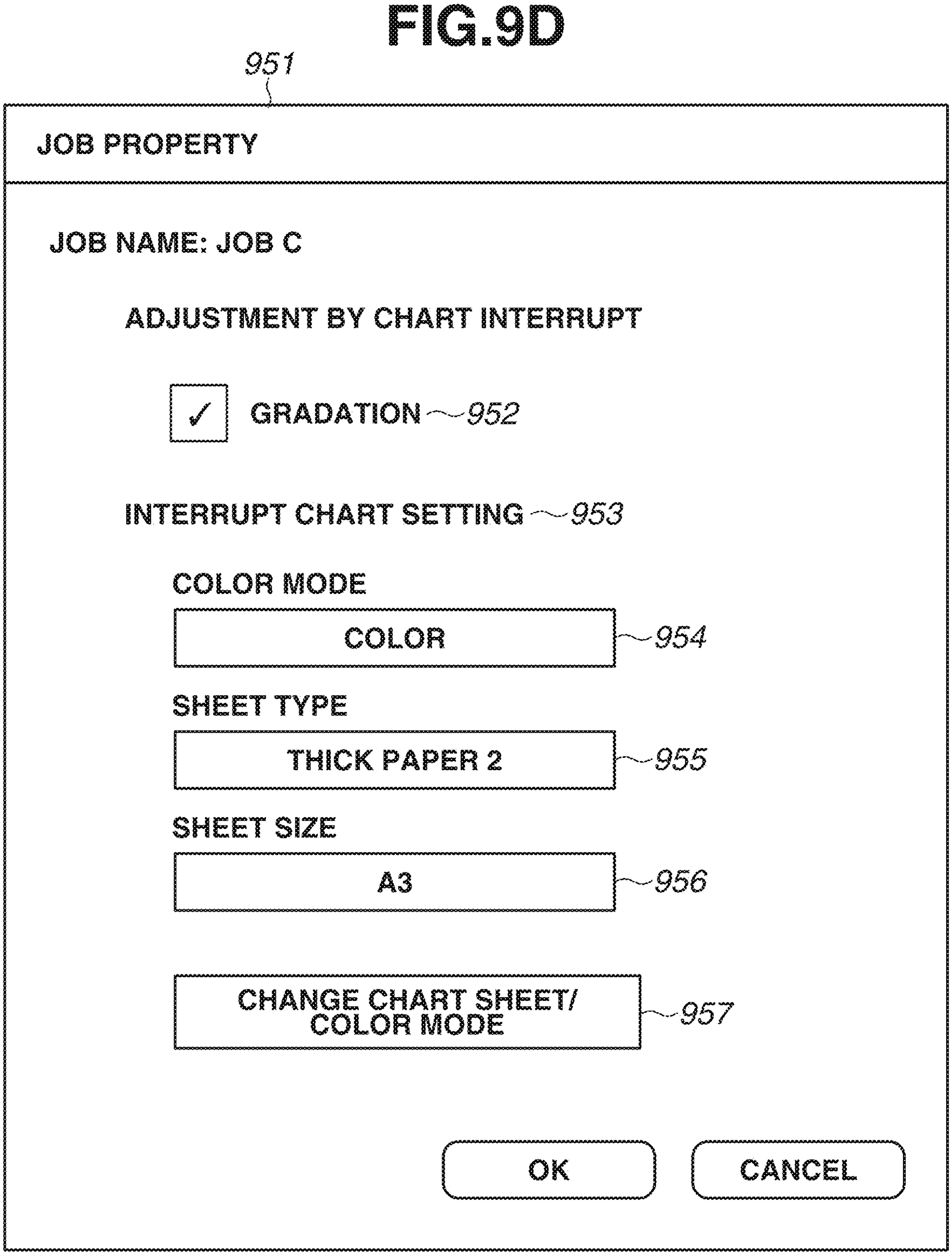
Figure 9E:
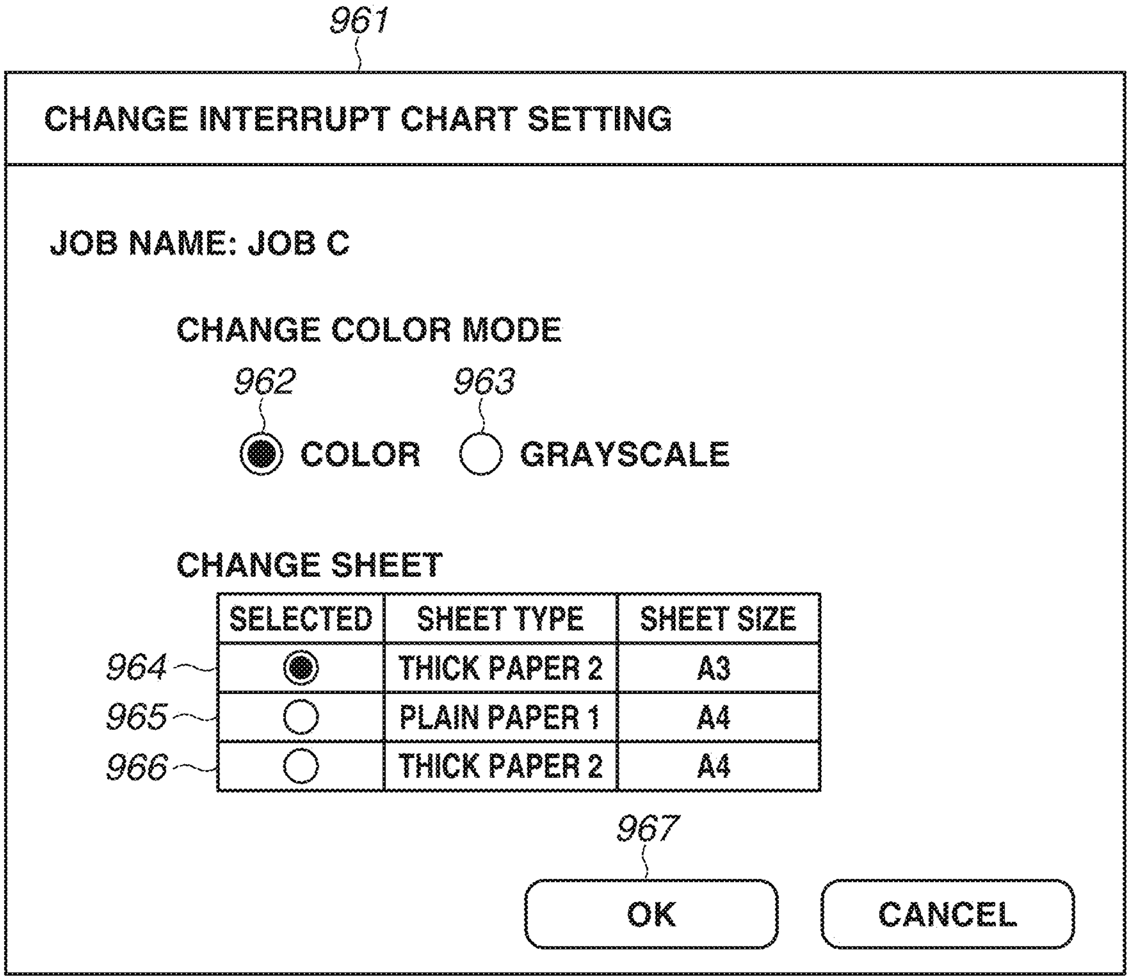

FIG. 9D illustrates an example of a UI screen for making print settings of a print job according to the present exemplary embodiment. This UI screen 951 is managed and generated on the print job management unit 342 by the interrupt adjustment setting unit 345, and displayed on the display unit 152 via the UI control unit 341. A checkbox 952 is a checkbox for specifying whether to make an interrupt adjustment. If this adjustment checkbox 952 is checked when the client PC 30 makes a job setting, the print management application displays the UI screen 901 with "adjustment" that is one of the print setting items managed by itself as "enabled".

If the adjustment checkbox 952 is checked, an interrupt adjustment to the print job is enabled.

If the adjustment checkbox 952 is unchecked by the operator, the interrupt adjustment to the print job is disabled. Sections 954 to 957 display the color mode, sheet type, and sheet size of an interrupt adjustment chart. Details thereof will be described below. Like FIG. 9D, FIG. 9E also illustrates a screen for editing the color mode, sheet type, and sheet size of an interrupt adjustment chart. Details thereof will be described below.

<About Table for Managing Color Modes, Sheet Types, and Sheet Sizes of Interrupt Adjustment Charts Determined Based on Print Settings of Print Jobs>

FIG. 10B illustrates a table 1002 for managing the color modes, sheet types, and sheet sizes of interrupt adjustment charts determined based on the print settings of print jobs. The table 1002 is stored in the HDD 144, and records the values of the color modes, sheet types, and sheet sizes determined based on an interrupt adjustment chart sheet determination procedure to be described below.

<About Table for Image Processing Apparatus to Manage Sheet Information about Sheets Set in Sheet Feed Stages of Image Forming Apparatus>

FIG. 11 illustrates a table 1101 for managing information about the sheet types and sheet sizes of the sheets set in the respective sheet feed stages 223 of the image forming apparatus 10. The sheet feed stage sheet management unit 347 updates the information in the table 1101 based on notifications about the sheet types and sheet sizes of the sheet feed stages 223 of the image forming apparatus 10.

<About Types of Charts to be Printed on Adjustment Chart and Sheet Sizes to Print Charts In>

There are four types of charts to be printed on an adjustment chart, i.e., C, M, Y, and K charts. In laying out the four types of charts on a sheet, it may sometimes need to divide and print the charts on a plurality of sheets depending on the chart sizes and the positions of the sensors 220. For example, in the present exemplary embodiment, a sheet size in which the four types of charts can be printed on a sheet will be defined as a large size. A sheet size in which the four types of charts are divided into twos and printed on a total of two sheets will be defined as a small size. In this example, a large-size sheet will be handled as "A3", and a small-size sheet "A4".

A case where the four types of charts are printed on a large-sized "A3" sheet for use and a case where the four types of charts are divided into twos and printed on two small-sized "A4" sheets for use will be compared as an example. Some image processing apparatuses can print in less time if the charts are printed on an "A3" sheet. The present exemplary embodiment also takes into account such a situation.

<About Pages of Adjustment Charts>

The pages of adjustment charts to be generated will be described with reference to FIGS. 12A and 12B.

Figure 12A:
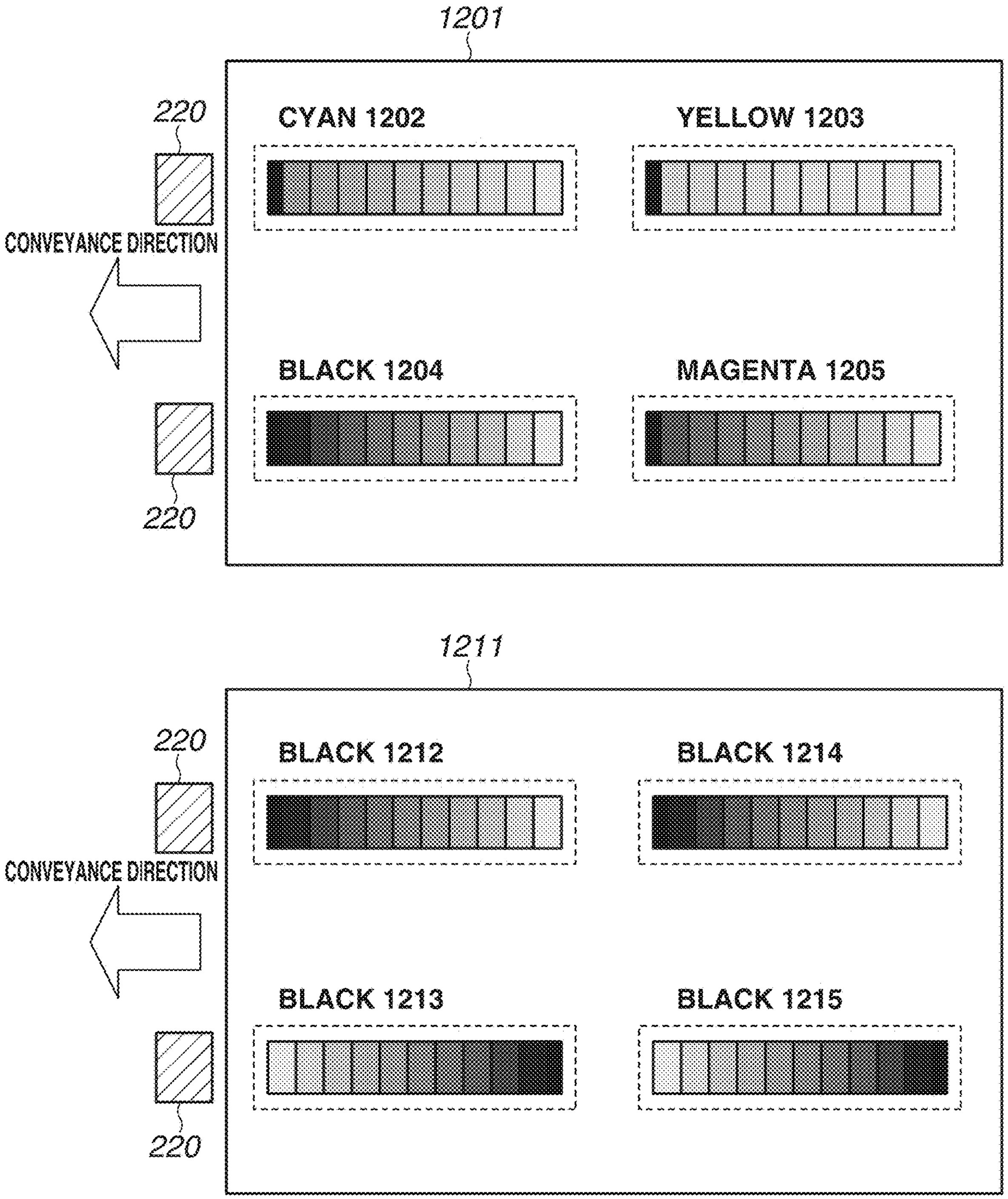
FIG. 12A is a diagram illustrating examples of layout of adjustment charts printed on large-sized sheets.
Figure 12B:
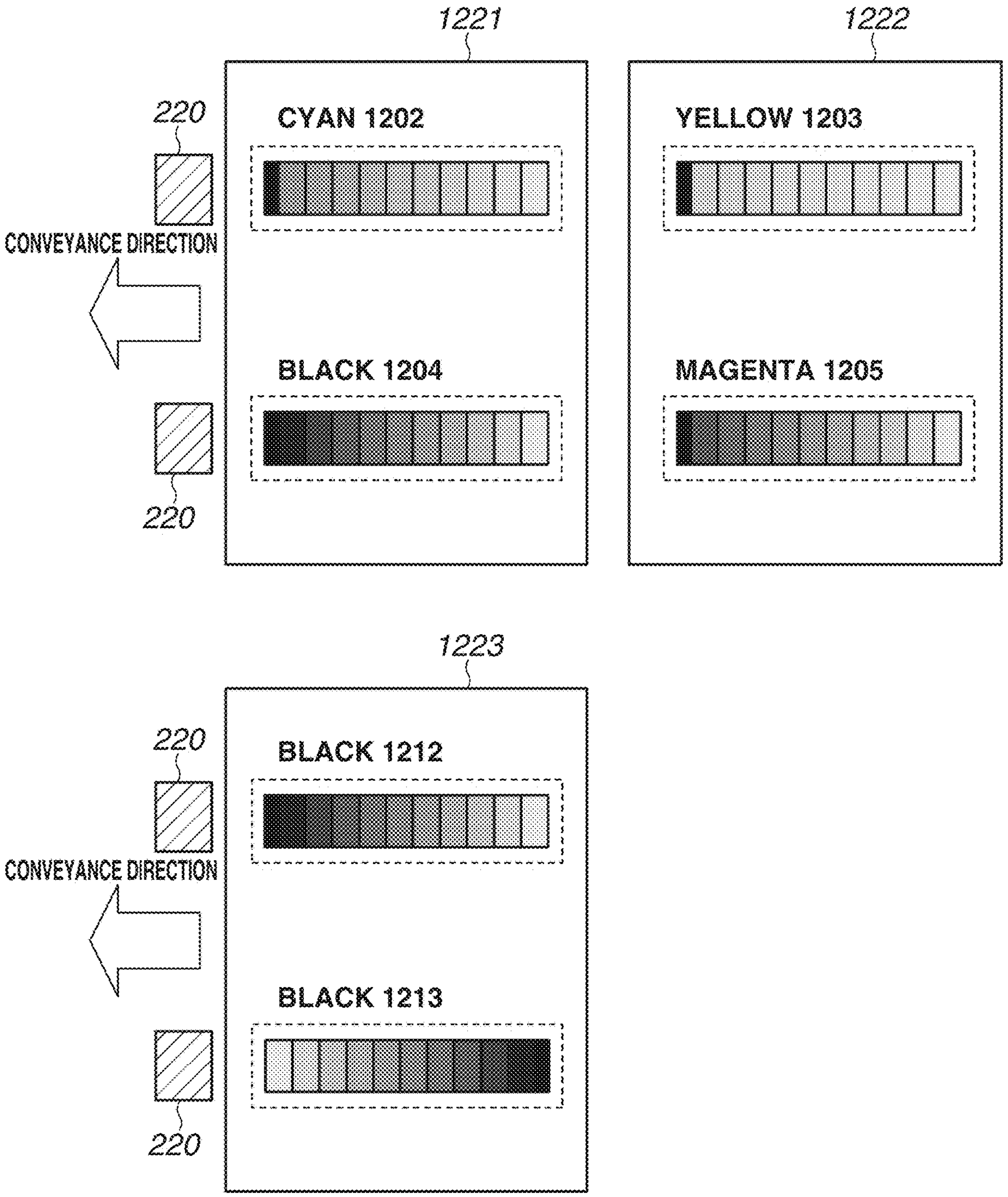
FIG. 12B is a diagram illustrating examples of layout of adjustment charts printed on small-sized sheets.

FIGS. 12A and 12B are diagrams illustrating examples of page images of adjustment charts. These adjustment charts are determined and generated by the interrupt adjustment chart determination unit 308. A page image 1201 is an example of a page image in which color gradation patches are laid out. A page image 1211 is an example of a page image in which monochrome gradation patches are laid out.

The page image 1201 illustrated in FIG. 12A includes gradation patches 1202 to 1205 expressed using four color toners at predetermined positions within a large-sized page. In this example, each toner forms 10 gradation patches (gradation pattern). However, the number of gradation patches is not limited thereto. A gradation pattern (gradation pattern image) includes a plurality of patch images with gradually changing color densities. The sensors 220 are disposed on the sheet conveyance path. The gradation patches 1202 to 1205 in the page image 1201 are arranged to pass the positions of the installed sensors 220. While the two sensors 220 here are described to be fixedly disposed, the number and positions of sensors 220 are not limited thereto.

One sensor 220 may be fixedly disposed at any position. Four sensors 220 may be fixedly disposed. One or more sensors 220 may be movably disposed. The adjustment chart may be generated based on the number and disposed state of the sensors 220 in a layout such that the gradation patches 1202 to 1205 can be read by the sensors 220. As one of factors for enabling the reading by the sensors 220, the layout of the gradation patches arranged on the adjustment chart may be changed depending on the sheet size and/or sheet type.

The page image 1211 includes gradation patches 1212 to 1215 expressed using one color of black toner, at predetermined positions within the page. In this example, the black toner forms 40 gradation patches. As described above, the number and layout of gradation patches to be arranged are not limited thereto.

FIG. 12B illustrates page images 1221 and 1222. In the page image 1221, gradation patches 1202 and 1204 are arranged at predetermined positions within a small-sized page. In the page image 1222, gradation patches 1203 and 1205 are arranged at predetermined positions within a small-sized page. The gradation patches in each of the page images 1221 and 1222 are expressed using two color toners. In using small-sized sheets, the gradation patches can be divided and laid out on a plurality of sheets depending on the number and size of the gradation patches and the arrangement of the sensors 220. This adjustment chart is an example of this case.

In the present exemplary embodiment, adjustment charts to be generated are switched based on the sheet size of the sheet to be used for the adjustment chart, set in the print job. More specifically, suppose that "A3" is specified as the sheet size of the sheet to be used for the adjustment chart. If the color mode is color, an adjustment chart exemplified by the page image 1201 is generated. If the color mode is grayscale, an adjustment chart exemplified by the page image 1211 is generated. Suppose now that "A4" is specified as the sheet size of the sheet to be used for the adjustment chart. If the color mode is color, adjustment charts exemplified by the page images 1221 and 1222 are generated. If the color mode is grayscale, an adjustment chart exemplified by a page image 1223 is generated.

<About Gradation Correction Processing>

Now, the gradation correction processing will be described.

The gradation correction processing refers to correction processing for maintaining the output density of the image forming apparatus 10 constant.

The printing apparatus 200 that performs printing by controlling toner is easily affected by printing sheets and the temperature and humidity of the environment where the printing apparatus 200 is installed, and is always changing in print output density. Pages generated by the same image processing can be different in printed output image quality if the output density of the printing apparatus 200 changes. The gradation correction processing is to obtain stable output image quality all the time.

The gradation correction processing is processing for correcting print data to provide an optimum output with predetermined toner densities. The gradation correction processing is typically implemented by preparing a lookup table (LUT) for converting an input signal value into an output signal value to provide an appropriate output for each toner component, and making LUT-based corrections in processing print data. As employed herein, the LUT for conversion will be referred to as a gradation correction table.

The principle of the gradation correction processing will be described with reference to FIGS. 13A to 13C. The following data is stored in the HDD 114 and managed by the page image control unit 303.

FIG. 13A illustrates an example of a table defining target densities serving as reference values of output density color by color. In this table, information about optimum output density values for 10 input signals from 10% to 100% is defined. This target information may be determined in advance by the printer vendor. Information about values obtained by the operator actually measuring outputs may be registered as the target information via the operation unit 130. Optimum output densities may be defined in any number of steps for more than or less than 10 input values.

FIG. 13B illustrates an example of measurement values obtained by printing gradation patch images (gradation pattern image) generated from 10 input signal values at a point in time and reading the densities thereof. The measurement values indicate the current output densities of the printing apparatus 200. The page image control unit 303 calculates a gradation correction table from the target information (FIG. 13A) and the measurement values (FIG. 13B).

FIG. 13C illustrates an example of density differences calculated as correction values. The differences may be simply used as the correction values. Values obtained through certain manipulations, such as multiplication by a constant, may be used as the correction values. The gradation correction table is generated by associating input signal values with signal values that provide the same densities as the respective target densities with output signal values based on the correction values. While this example has been described by using 10 input signal values as an example, this is not restrictive. The greater the number of used signal values, the higher the correction accuracy, but the greater the number of patches for measurement. Since the output density also varies depending on the printing sheet, gradation target information and a gradation correction table may be prepared for each sheet type.

While the gradation correction processing on all the four colors has been described here, the gradation correction processing does not need to be performed on all the four colors at a time.

The gradation correction processing may be performed on any one or more of the colors only. In the present exemplary embodiment, the gradation correction processing is performed on all the four colors if the adjustment chart to be described below is in four colors, and only on black if the adjustment chart is monochrome.

<Procedure for Determining Sheet for Interrupt Adjustment Chart>

Some print products use a plurality of types of sheets. Take a catalogue published by a museum as an example. A catalogue includes a front cover page, body pages including photographs, and chapter pages sectioning the body pages, for which sheets of respective different surface properties may be used. In one embodiment, the sheet to be used for an interrupt adjustment chart is the same as those used in the print job. If a plurality of types of sheets is used in a print job, which sheet to print the adjustment chart on needs to be determined. For example, in the case of a catalogue, a lot of photographs of exhibits such as art works are printed on the body pages. Accordingly, the adjustment chart is printed a color is adjusted using the same sheet as those of the body pages carrying the contents most wanted to show to the viewers. Now, take a paperback as another example. The body mainly includes text while the cover page is often decoratively designed to attract customers' attention when the book is displayed on a shelf. With such a book configuration, an emphasis is placed on the color of the cover page. In one embodiment, the adjustment chart is output and a color is adjusted using the sheet used for the cover page. Thus, the print operator is to determine which sheet to print the adjustment chart on. However, it is troublesome to specify the sheet for the adjustment chart each time.

An interrupt adjustment chart sheet determination procedure according to the present exemplary embodiment will be described. FIG. 5 is a flowchart illustrating an execution procedure for the image processing apparatus 20. This flowchart is implemented by the CPU 141 reading a program stored in the HDD 144 of the image processing apparatus 20 into the RAM 143 and executing the program. The following description is made also with reference to FIGS. 10A, 10B, and 11. The flowchart is called in step S405 of FIG. 4 to be described below. More specifically, in step S405, the print job management unit 342 confirms that the interrupt adjustment to the print job is enabled, and the interrupt adjustment chart sheet determination unit 346 starts this procedure.

<About Determination of Color Mode and Sheet for Interrupt Adjustment Chart Used in Job A>

First, a method for determining an interrupt adjustment chart sheet for job A to which an interrupt adjustment is enabled will be described. The interrupt adjustment chart sheet determination unit 346 confirms that the interrupt adjustment is enabled in the print setting information, and records the print setting information in the table 1001. In this example, the print setting information about job A is recorded in row [a] of FIG. 10B. The processing then proceeds to step S501 of FIG. 5. In step S501, the interrupt adjustment chart sheet determination unit 346 accesses the table 1001 to check for a sheet registered using the media mix.

Since there is no sheet for job A registered using the media mix (NO in step S501), the processing proceeds to step S502. In step S502, the interrupt adjustment chart sheet determination unit 346 accesses the table 1001. The interrupt adjustment chart sheet determination unit 364 records the information about the color mode, sheet type, and sheet size registered by the job setting of job A into the RAM 143 as the color mode and sheet to be used for the interrupt adjustment chart.

In the case of this example, the color mode "color", the sheet type "plain paper 1", and the sheet size "A4" are recorded into the RAM 143. The processing proceeds to step S503. In step S503, the interrupt adjustment chart sheet determination unit 346 accesses the RAM 143 and obtains the information about the color mode and the sheet to be used for the interrupt adjustment chart. Then, the interrupt adjustment chart sheet determination unit 346 accesses the table 1002 of FIG. 10B and records the job name "job A" in row [a], column [1], the color mode "color" in column [2], the sheet type "plain paper 1" in column [3], and the sheet size "A4" in column [4]. Then, the processing ends.

<About Determination of Color Mode and Sheet for Interrupt Adjustment Chart Used in Job B>

Next, a method for determining an interrupt adjustment chart sheet for job B to which an interrupt adjustment is enabled will be described. The interrupt adjustment chart sheet determination unit 346 confirms that the interrupt adjustment is enabled in the print setting information, and records the print setting information in the table 1001 of FIG. 10A. In this example, the print setting information about job B is recorded in rows [b] and [c]. Then, the processing proceeds to step S501. In step S501, the interrupt adjustment chart sheet determination unit 346 accesses the table 1001 to check whether a sheet is registered using the media mix. Since there is a sheet for job B registered using the media mix (YES in step S501), the processing proceeds to step S504. In step S504, the interrupt adjustment chart sheet determination unit 346 accesses the table 1001 to check whether there is a sheet with the color mode "color" among the sheets specified for job B by the job setting and the media mix. In the case of this example, the sheet settings for job B are registered in rows [b] and [c]. However, there is no sheet with the color mode "color" in column [3]. Accordingly, the interrupt adjustment chart sheet determination unit 346 determines that there is no sheet for job B with the color mode "color" (NO in step S504), and the processing proceeds to step S505.

In step S505, the interrupt adjustment chart sheet determination unit 346 records the information about the color mode and the sheet type registered in the job setting into the RAM 143 as the color mode and sheet type of the sheet to be used for the interrupt adjustment chart. In the case of this example, the color mode "grayscale" and the sheet type "plain paper 1" are recorded into the RAM 143. Then, the processing proceeds to step S506.

In step S506, the interrupt adjustment chart sheet determination unit 346 accesses the table 1001 and checks the sheets to be used in the job. The interrupt adjustment chart sheet determination unit 346 then accesses the table 1101 and checks whether all the sheets to be used in the job are set in the sheet feed stages 223. In the case of this example, the sheets to be used in job B include sheets of sheet type "plain paper 1" and sheet size "A4" and sheets of sheet type "thick paper 1" and sheet type "A4", which are set in sheet feed stages 1 and 2, respectively. In such a case, the interrupt adjustment chart sheet determination unit 346 determines that all the sheets to be used in the print job are set in any one of the sheet feed stages 223 (YES in step S506), and the processing proceeds to step S507.

In step S507, the interrupt adjustment chart sheet determination unit 346 checks whether large-sized sheets of adjustment sheet type (sheet type of the sheet to be used for the interrupt adjustment chart) are set in a sheet feed stage 223. In step S507, the interrupt adjustment chart sheet determination unit 346 accesses the RAM 143 and confirms that the sheet type of the sheet to be used for the interrupt adjustment chart is "plain paper 1". The interrupt adjustment chart sheet determination unit 346 accesses the table 1101 and checks whether large-sized sheets of "plain paper 1" are set. In the case of this example, large-sized or "A3" sheets of "plain paper 1" are set in sheet feed stage 5. In such a case (YES in step S507), the processing proceeds to step S508.

In step S508, the interrupt adjustment chart sheet determination unit 346 accesses the RAM 143 and sets the sheet size of the sheet to be used for the interrupt adjustment chart to the large size. In the case of this example, the sheet size is updated from "A4" to "A3". Then, the processing proceeds to step S503. If, in step S507, no sheet is set in sheet feed stage 5 of the table 1101, the interrupt adjustment chart sheet determination unit 346 determines that large-sized sheets of sheet type "plain sheet 1" are not set in any of the sheet feed stages 223 (NO in step S507), and the processing proceeds to step S509.

In step S509, the interrupt adjustment chart sheet determination unit 346 accesses the RAM 143 and checks the sheet size of the sheet of sheet type "plain paper 1". In the case of this example, the sheet size is "A4", i.e., the sheet is of small size. In such a case, the processing proceeds to step S503 with the sheet size of the sheet to be used for the interrupt adjustment chart maintained as small size, i.e., "A4". The subsequent processing has already been described, and a description thereof will thus be omitted.

<About Determination of Color Mode and Sheet for Interrupt Adjustment Chart Used in Job C>

First, a method for determining the interrupt adjustment chart sheet for job C to which an interrupt adjustment is enabled will be described. The interrupt adjustment chart sheet determination unit 346 confirms that the interrupt adjustment is enabled in the print setting information, and records the print setting information in the table 1001.

In this example, the print setting information about job C is recorded in rows [d] to [f] of the table 1001 in FIG. 10A. Then, the processing then proceeds to step S501. In step S501, the interrupt adjustment chart sheet determination unit 346 accesses the table 1001 to check whether a sheet is registered using the media mix. Since there are sheets for job C registered using media mix (YES in step S501), the processing proceeds to step S504. In step S504, the interrupt adjustment chart sheet determination unit 346 accesses the table 1001 and checks whether there is a sheet with the color mode "color" among the sheets for job C specified by the job setting and the media mix. In the case of this example, the sheet settings for job C are registered in rows [d] to [f] of the table 1001 in FIG. 10A.

The color mode "color" is registered in rows [e] and [f], column [3], of the table 1001 in FIG. 10A.

Thus, the interrupt adjustment chart sheet determination unit 346 determines that there are sheets for job C with the color mode "color" (YES in step S504), and the processing proceeds to step S510. In step S510, the interrupt adjustment chart sheet determination unit 346 records the information about the color mode, sheet type, and sheet size registered in the job setting into the RAM 143 as the color mode and the sheet candidate to be used for the interrupt adjustment chart.

In the case of this example, the color mode "color" and the sheet type "thick paper 2" are recorded in the RAM 143. Then, the processing proceeds to step S506. In step S506, the interrupt adjustment chart sheet determination unit 346 accesses the table 1001 and checks the sheets to be used in the print job. The interrupt adjustment chart sheet determination unit 346 then accesses the table 1101 and checks whether all the sheets to be used in the print job are set in any of the sheet feed stages 223. In the case of this example, the sheets to be used in job C include sheets of sheet type "plain paper 1" and sheet size "A4", sheets of sheet type "thick paper 2" and sheet size "A3", and sheets of sheet type "thick paper 2" and sheet size "A4". Of these, the sheets of sheet type "thick paper 2" and sheet size "A3" are not set in any of the sheet feed stages 223. In such a case, the interrupt adjustment chart sheet determination unit 346 determines that not all the sheets to be used in the print job are set in the sheet feed stages 223 (NO in step S506), and the processing proceeds to step S511. In step S511, the interrupt adjustment chart sheet determination unit 346 accesses the RAM 143 and confirms that the adjustment sheet type is "thick paper 2".

The interrupt adjustment chart sheet determination unit 346 then accesses the table 1101 and checks whether job C uses both large- and small-sized sheets of adjustment sheet type "thick paper 2". In the case of this example, both "A3" and "A4" sheets are set to be used (YES in step S511), and thus the processing proceeds to step S512. In step S512, the interrupt adjustment chart sheet determination unit 346 accesses the RAM 143 and sets the sheet size of the sheet to be used for the interrupt adjustment chart to the large size. In the case of this example, the sheet size is set to "A3". Since the subsequent processing has already been described, a description thereof will be omitted.

<About Determination of Color Mode and Sheet for Interrupt Adjustment Chart Used in Job D>

First, a method for determining a sheet for job D to which an interrupt adjustment is enabled will be described. The interrupt adjustment chart sheet determination unit 346 confirms that the interrupt adjustment is enabled in the print setting information, and records the print setting information in the table 1001.

In this example, the print setting information about job D is recorded in rows [g] and [h] in the table 1001. Then, the processing proceeds to step S501. The subsequent processing proceeds in order of steps S501, S504, S510, S506, and S511. Details thereof have already been described and will thus be omitted here. In step S511, the interrupt adjustment chart sheet determination unit 346 accesses the RAM 143 and confirms that the adjustment sheet type is "thick paper 3". The interrupt adjustment chart sheet determination unit 346 then accesses the table 1101 and checks whether job D uses both large- and small-sized sheets of the adjustment sheet type "thick paper 3".

In the case of this example, "A4" sheets are set to be used (NO in step S511). The processing thus proceeds to step S513.

In step S513, the interrupt adjustment chart sheet determination unit 346 accesses the RAM 143 and sets the sheet size of the sheet to be used for the interrupt adjustment chart to the sheet size of the sheet used in the job. In the case of this example, the sheet size is set to "A4". Since the subsequent processing has already been described, a description thereof will be omitted.

<About Change in Settings of Interrupt Adjustment Chart>

If the operator presses the interrupt adjustment button 924 on the job property screen 910 of FIG. 9B, the UI control unit 341 notifies the print job management unit 342 thereof. The print job management unit 342 instructs the interrupt adjustment setting unit 345 to check whether an interrupt adjustment to the job is enabled. If the interrupt adjustment to the job is enabled, the print job management unit 342 accesses the table 1002 and obtains the color mode, sheet type, and sheet size of the sheet to be used for the interrupt adjustment chart. The print job management unit 342 then instructs the UI control unit 341 to display the UI screen 951 on the display unit 152.

In this example, the UI screen 951 displays a chart interrupt instruction, the color mode, the sheet type, and the sheet size set in job C. If the operator operates the operation unit 150 and presses a chart sheet and color mode change button 957, the UI control unit 341 notifies the print job management unit 342 thereof. In response, the print job management unit 342 accesses the table 1001 and obtains the sheet types and sheet sizes of all the sheets specified in the job. The print job management unit 342 further accesses the table 1002 and obtains the color mode, sheet type, and sheet size of the sheet to be used for the interrupt adjustment chart. The print job management unit 342 then instructs the UI control unit 341 to display a screen 961 (see FIG. 9E) on the display unit 152. The screen 961 is a screen for changing the settings of the interrupt adjustment chart.

In this screen, a radio button 962 and a row 964 corresponding to the color mode, sheet type, and sheet size of the interrupt adjustment chart determined for job C based on the settings of the job are displayed in a selected state. Rows 965 and 966 display the sheet types and sheet sizes of the other sheets set for job C, obtained from the table 1001, as selection candidate sheets.

If the operator operates the operation unit 150 to change the color mode and/or the sheet and press an OK button 967, the UI control unit 341 notifies the print job management unit 342 thereof. The print job management unit 342 accesses the table 1002 and writes the values specified on the screen 961. For example, suppose that a radio button 963 "grayscale" and a row 965 indicating a sheet type "plain paper 1" and a sheet size "A4" are selected on the screen 961. In such a case, "grayscale" is written to row [c], column [2] of the table 1002, "plain paper 1" column [3], and "A4" column [4].

If the operator presses a print button 903, the property button 904, or the delete button 905 on the UI screen 901 of FIG. 9A with the target print job selected, the print job management unit 342 performs processing corresponding to the pressed button. If the print button 903 is pressed, the print job management unit 342 starts print processing on the selected print job. When the print processing is completed, the print job management unit 342 transmits the print data to the image forming apparatus 10.

<About Procedure for Executing Print Job with Interrupt Adjustment>

A procedure for executing a print job with an interrupt adjustment according to the present exemplary embodiment will be described.

The execution of a print job involves processing by both the image processing apparatus 20 and the image forming apparatus 10. A description will thus be given in order. First, the processing by the image processing apparatus 20 will be described.

Figure 4:
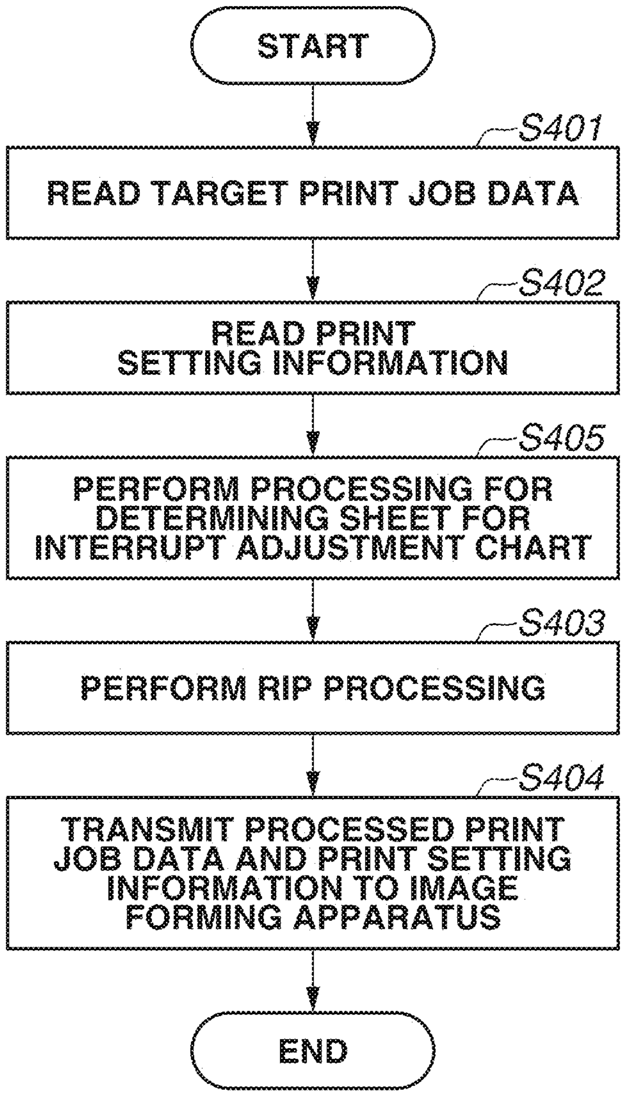
FIG. 4 is a flowchart illustrating an execution procedure for an image processing apparatus.
Figure 5:
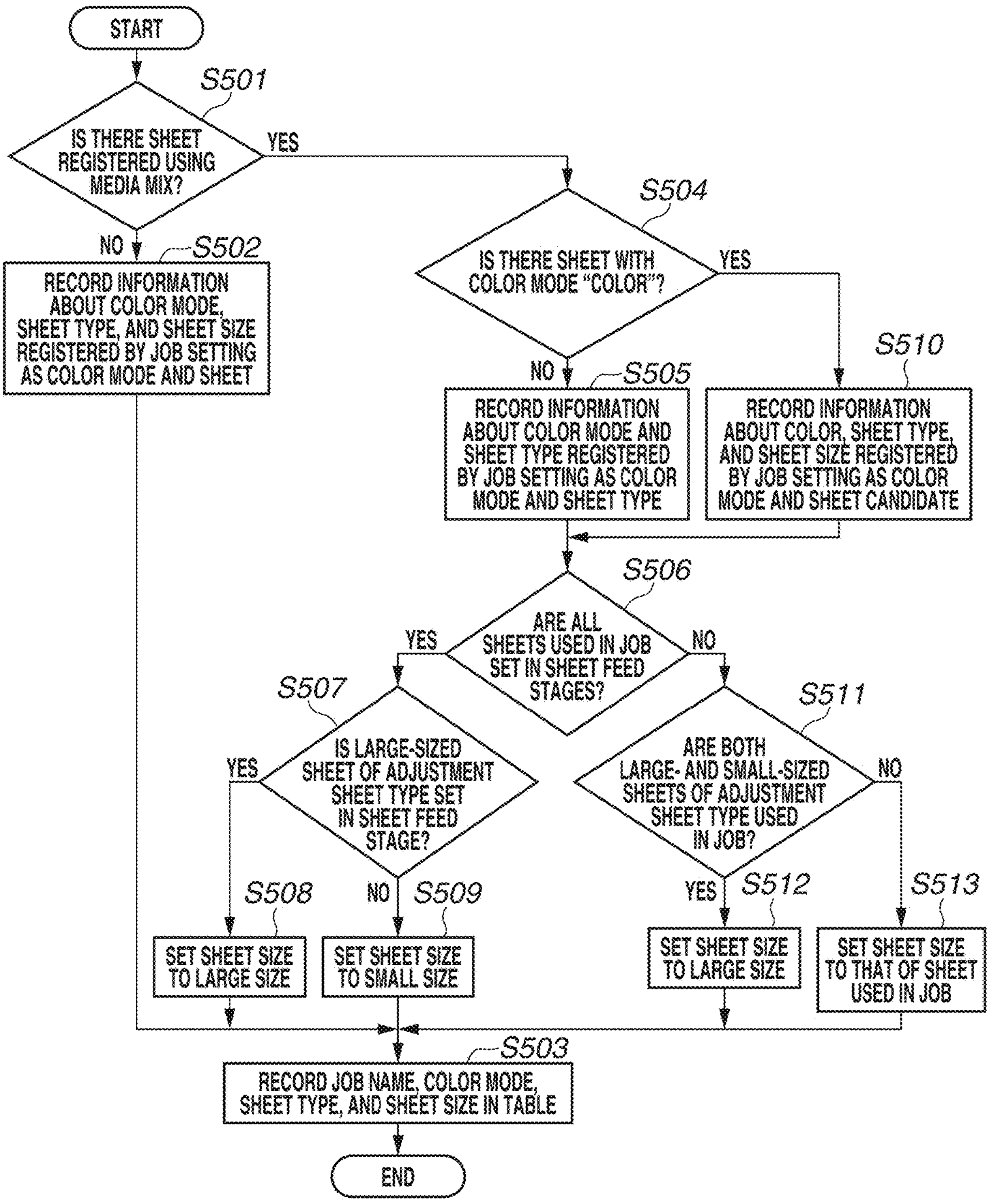
FIG. 5 is a flowchart illustrating an execution procedure for sheet determination processing of an interrupt adjustment chart by the image processing apparatus.

FIG. 4 is a flowchart illustrating an execution procedure for the image processing apparatus 20. This flowchart is implemented by the CPU 141 reading a program stored in the HDD 144 of the image processing apparatus 20 into the RAM 143 and executing the program.

This flowchart is started when the print button 903 is pressed with a print job selected on the UI screen 901 of the print management application illustrated in FIG. 9A.

In step S401, the print job management unit 342 reads the target print job data.

In step S402, the print job management unit 342 reads the print setting information about the print settings. Examples of the print settings include a page layout setting of the print job and color management system (CMS)-related setting items such a color profile, in addition to the items described above with reference to FIGS. 9A to 9E. There are also a lot of other items, including settings of image correction processing such as halftone processing, settings of the operation of the finishing apparatus, and interrupt adjustment instructions. It will be understood that the print settings of a print job are not limited to the above-described items, and there are various other setting items.

In step S405, the print job management unit 342 confirms that an interrupt adjustment to the print job is enabled, and starts the processing of FIG. 5. If the interrupt adjustment to the print job is not enabled, the processing proceeds to step S403 without executing the flowchart of FIG. 5.

In step S403, the print job processing unit 343 performs RIP processing on the print job. As employed herein, the RIP processing on the print job refers to analyzing the submitted print job and performing predetermined processing such as color conversion based on the print setting information read in step S402 to develop the print job into rasterized image data. After the execution of this processing, the print job becomes a page-by-page image data group (page image data group).

In step S404, the print job management unit 342 transmits the processed print job data to the image forming apparatus 10 via the data transmission and reception unit 344. The print job data includes setting item information about the print job to be used for processing by the image forming apparatus 10 in addition to the developed page image data group. If the interrupt adjustment to the print job is enabled, the print job data further includes the information about the color mode of the interrupt adjustment chart and the sheet type and the sheet size of the sheet to be used, determined in step S405.

After the end of step S404, the print job management unit 342 ends the flowchart.

Next, the processing by the image forming apparatus 10 will be described.

First, a procedure for executing a print job with an interrupt adjustment will be described.

Figure 6:
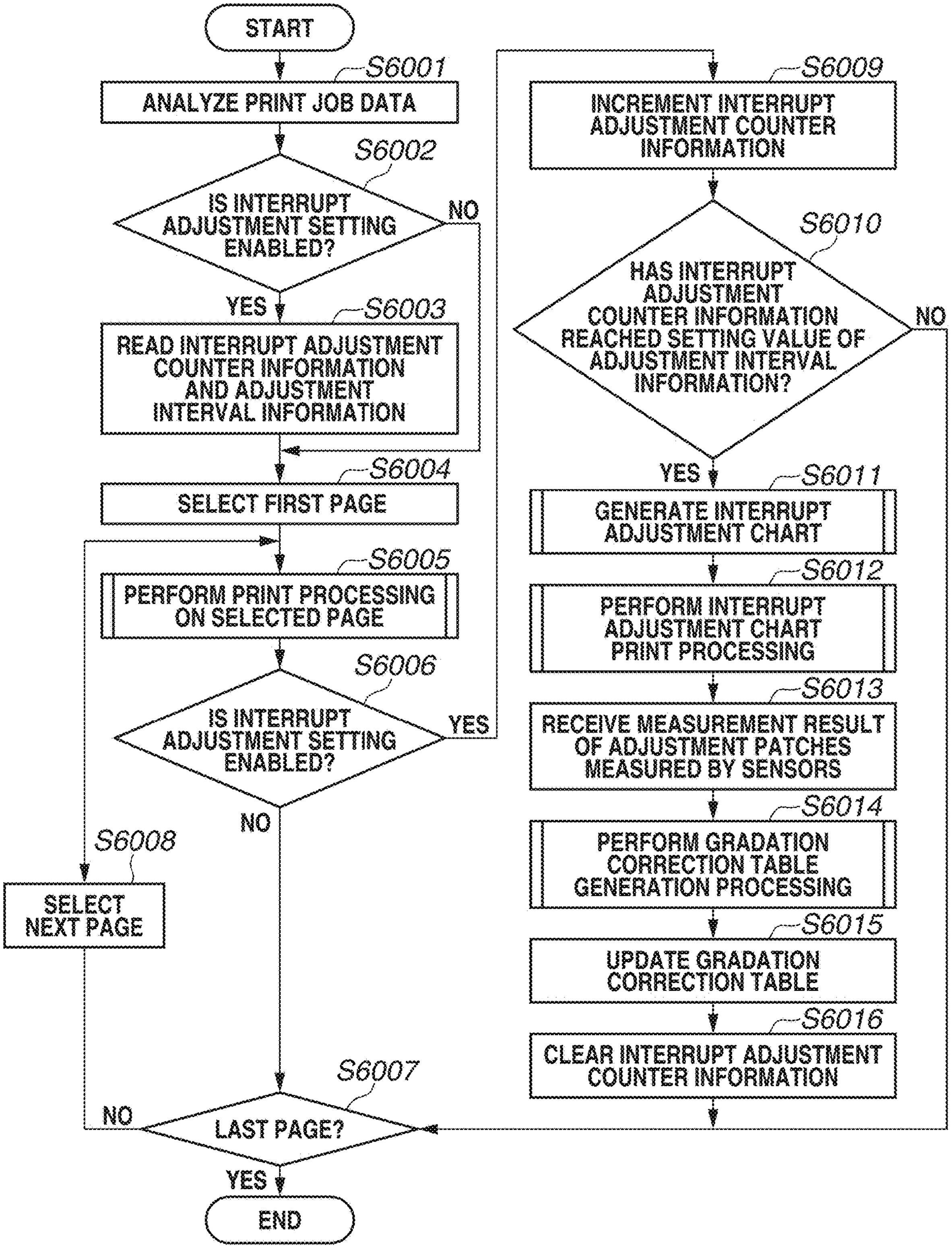
FIG. 6 is a flowchart illustrating an execution procedure for a print job with interrupt adjustment by an image forming apparatus.

FIG. 6 is a flowchart illustrating a procedure for executing a print job with an interrupt adjustment by the image forming apparatus 10. This flowchart is implemented by the CPU 111 reading a program stored in the HDD 114 of the image forming apparatus 10 into the RAM 113 and executing the program.

This flowchart is started when the print processing of the print job by the image processing apparatus 20 is completed in step S404 and the print job data is received.

In step S6001, the page image analysis unit 302 analyzes the received print job data.

Here, the page image analysis unit 302 checks the content of the image data group and the setting item information in the received print job data. The setting items here include whether an interrupt adjustment setting is enabled and, if the interrupt adjustment setting is enabled, the information about the color mode of the interrupt printing and the sheet type and sheet size of the sheet to be used in the interrupt printing are included.

In step S6002, the page image analysis unit 302 determines whether the interrupt adjustment setting is enabled. If the interrupt adjustment setting is enabled (YES in step S6002), the processing proceeds to step S6002.

In step S6003, the page image analysis unit 302 reads interrupt adjustment counter information and adjustment interval information from the interrupt adjustment chart print control unit 309.

If, in step S6002, the interrupt adjustment setting is disabled (NO in step S6002), or after the processing of step S6003, the processing proceeds to step S6004. In step S6004, the page image control unit 303 selects the first piece of page image data (first page) in the received and analyzed print job data. In step S6005, the page image control unit 303 performs print processing on the selected page.

Figure 14A:
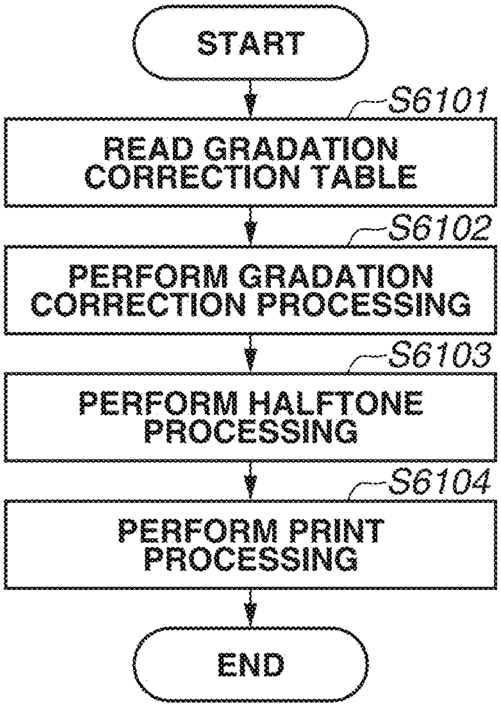
FIGS. 14A, 14B, and 14C are flowcharts illustrating execution procedures for interrupt adjustment by the image forming apparatus.

The print processing performed on the page in step S6005 will be described with reference to FIG. 14A. FIG. 14A is a flowchart illustrating print processing of the page image data by the image forming apparatus 10. This flowchart is implemented by the CPU 111 reading a program stored in the HDD 114 into the RAM 113 and executing the program.

In step S6101, the page image control unit 303 reads a gradation correction table to be described below.

In step S6102, the page image control unit 303 performs gradation correction processing.

In step S6102, the page image control unit 303 converts the signal values of the page image data to be processed by using the gradation correction table read in step S6101.

In step S6103, the page image control unit 303 performs halftone processing. The halftone processing is processing for converting the signal values of the page image data expressed in multiple gradation levels into fewer gradation levels that the printing apparatus 200 can output. The halftone processing is a known technique for rendering a single pixel in page image data over a wide area, thereby expressing multiple gradation levels in a pseudo manner while reducing the number of gradation levels.

In step S6104, the engine control unit 304 performs print processing by forming the page image data converted into a state printable by the printing apparatus 200 on a sheet. After the completion of the print output of the target page, this procedure ends.

Referring back to the flowchart of FIG. 6, in step S6006, the page image control unit 303 determines, like in step S6002, whether the interrupt adjustment setting is enabled.

In step S6006, if the interrupt adjustment setting is disabled (NO in step S6006), the processing proceeds to step S6007. In step S6007, the page image control unit 303 determines whether the processed page is the last page of the print job. If the processed page is determined to be the last page (YES in step S6007), this procedure ends. If the processed page is determined to not be the last page (NO in step S6007), the processing proceeds to step S6008. In step S6008, the page image control unit 303 selects the next page. Then, the processing returns to step S6005.

In step S6006, if the interrupt adjustment setting is enabled (YES in step S6006), the processing proceeds to step S6009. In step S6009, the interrupt adjustment chart print control unit 309 performs an increment operation to increment the interrupt adjustment counter information read in step S6003 by one.

In step S6010, the interrupt adjustment chart print control unit 309 determines whether the interrupt adjustment counter information has reached the setting value of the adjustment interval information read in step S6003. If the interrupt adjustment counter information has reached the setting value of the adjustment interval information (YES in step S6010), the processing proceeds to step S6011. In step S6011 and the subsequent steps, the interrupt adjustment chart print control unit 309 performs print processing on an adjustment page. If not (NO in step S6010), the processing proceeds to step S6007 to continue the above-described processing.

In step S6011, the interrupt adjustment chart determination unit 308 and the interrupt adjustment chart print control unit 309 generate an interrupt adjustment chart.

Figure 7:
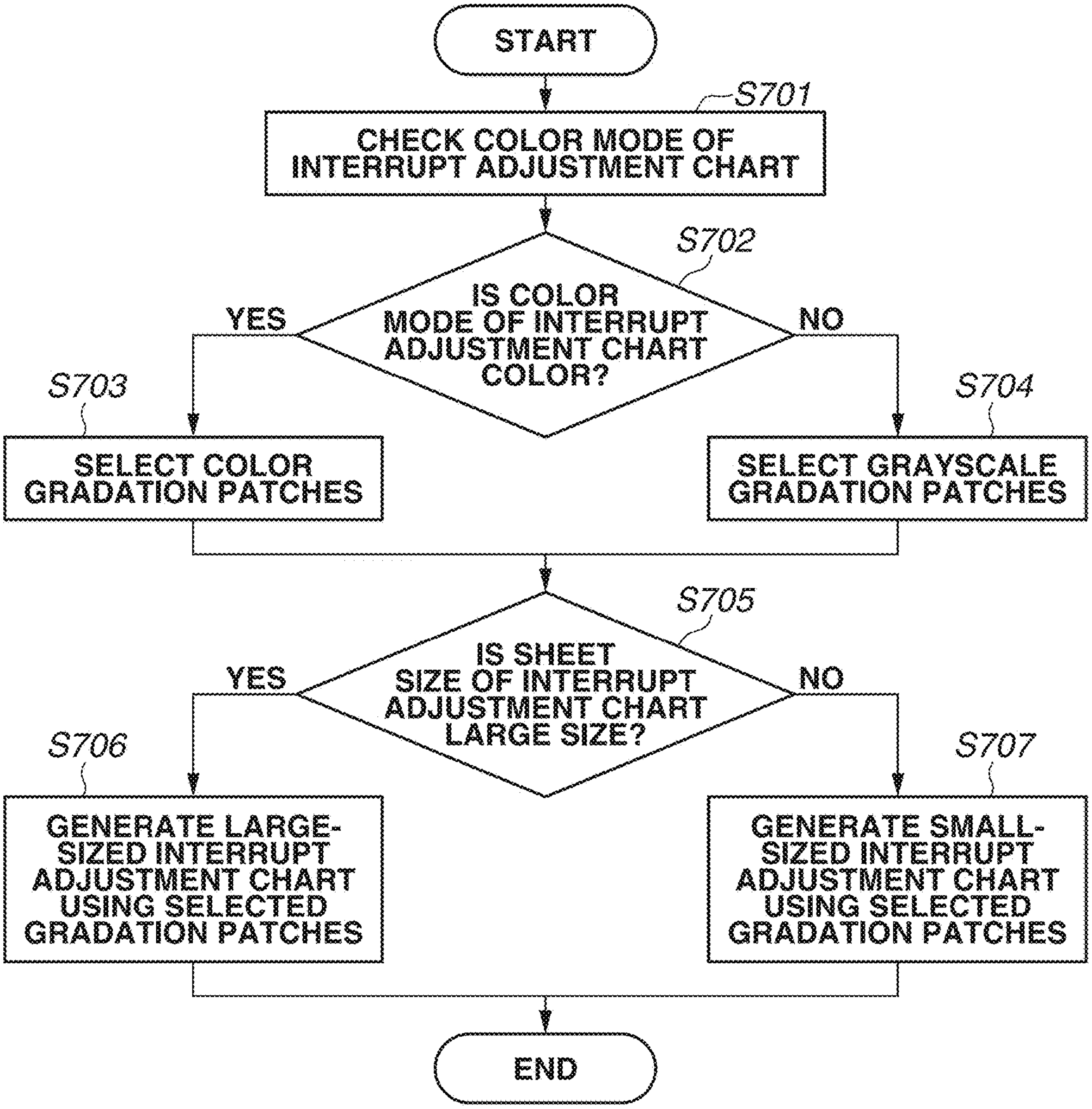
FIG. 7 is a flowchart illustrating an execution procedure regarding the generation of an interrupt adjustment chart by the image forming apparatus.

The determination and generation of the interrupt adjustment chart in step S6011 will be described. FIG. 7 is a flowchart illustrating a processing procedure of the generation of the interrupt adjustment chart in step S6011. This flowchart is implemented by reading a program stored in the HDD 114 of the image forming apparatus 10 into the RAM 113 and executing the program by the CPU 111.

In step S701, the interrupt adjustment chart determination unit 308 checks the received color mode of the interrupt adjustment chart. Then, the processing proceeds to step S702.

In step S702, the interrupt adjustment chart determination unit 308 determines whether the color mode of the interrupt adjustment chart is color or grayscale. If the color mode is color (YES in step S702), the processing proceeds to step S703. If the color mode is grayscale (NO in step S702), the processing proceeds to step S704. In step S703, the interrupt adjustment chart determination unit 308 selects color gradation patches.

In step S704, the interrupt adjustment chart determination unit 308 selects grayscale gradation patches.

In step S705, the interrupt adjustment chart determination unit 308 checks the sheet size of the interrupt adjustment chart. If the sheet size is the large size (YES in step S705), the processing proceeds to step S706. If the sheet size is the small size (NO in step S705), the processing proceeds to step S707. In step S706, the interrupt adjustment chart determination unit 308 generates a large-sized interrupt adjustment chart using the gradation patches selected in step S703 or S704. In step S707, the interrupt adjustment chart determination unit 308 generates a small-sized interrupt adjustment chart using the gradation patches selected in step S703 or S704.

Referring back to the flowchart of FIG. 6, in step S6012, the interrupt adjustment chart print control unit 309 performs interrupt adjustment chart print processing.

The interrupt adjustment chart print processing performed in step S6012 will be described with reference to FIG. 14B.

Figure 14B:
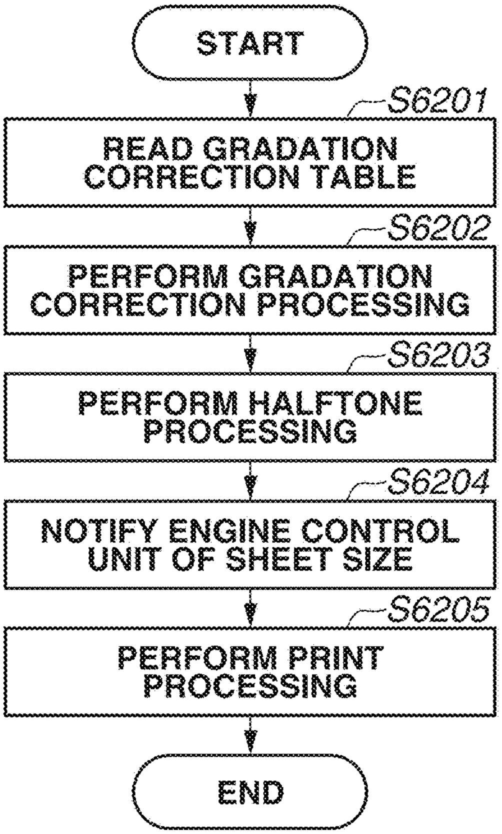

FIG. 14B is a flowchart illustrating the interrupt adjustment chart print processing by the image forming apparatus 10. This flowchart is implemented by reading a program stored in the HDD 114 of the image forming apparatus 10 into the RAM 113 and executing the program by the CPU 111.

In step S6201, the interrupt adjustment chart print control unit 309 reads the current gradation correction table. In step S6202, the interrupt adjustment chart print control unit 309 performs the gradation correction processing.

In step S6203, the interrupt adjustment chart print control unit 309 performs the halftone processing. In step S6204, the interrupt adjustment chart print control unit 309 checks the sheet size of the interrupt adjustment chart, and notifies the engine control unit 304 of the sheet size. The interrupt adjustment chart print control unit 309 then instructs the sensor control unit 305 to control the sensors 220 and measure the densities of the gradation patches formed and printed on the interrupt adjustment chart generated in step S706 or S707.

In step S6205, the engine control unit 304 feeds a sheet or sheets of the size notified in step S6204, forms the page image(s) of the interrupt adjustment chart on the fed sheet(s), and outputs the print product. Meanwhile, the sensor control unit 305 measures the densities of the gradation patches. After the completion of the printing, this procedure ends.

Referring back to the flowchart of FIG. 6, in step S6013, the interrupt adjustment execution unit 310 receives the measurement result of the gradation patches measured by the sensors 220.

In step S6014, the interrupt adjustment execution unit 310 generates gradation correction data (gradation correction table).

Gradation correction table generation processing performed in step S6014 will be described with reference to FIG. 14C. The principle of the gradation correction is the same as that described above.

Figure 14C:
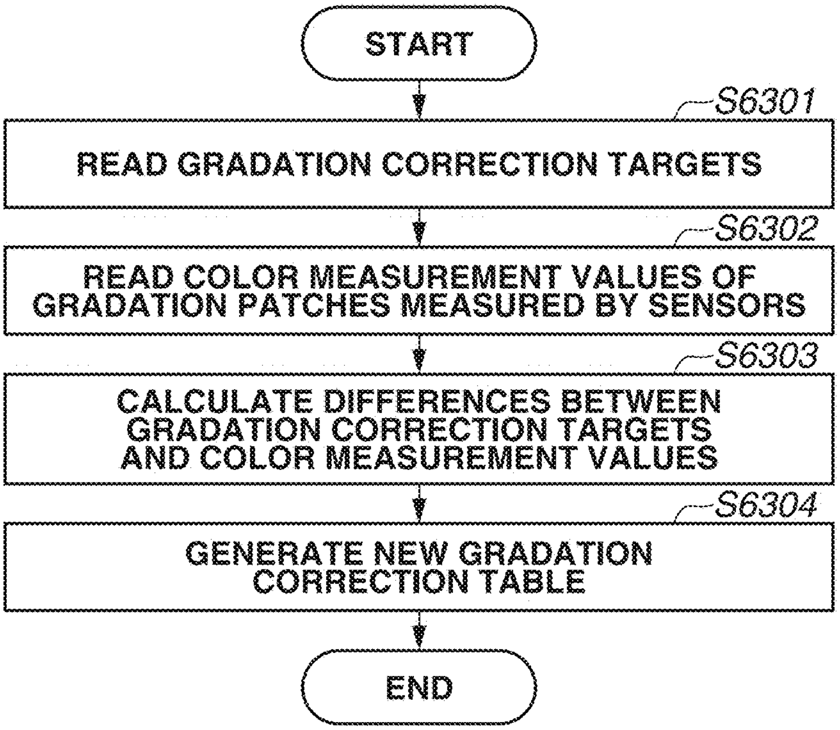

FIG. 14C is a flowchart illustrating the gradation correction table generation processing by the image forming apparatus 10. This flowchart is implemented by reading a program stored in the HDD 114 of the image forming apparatus 10 into the RAM 113 and executing the program by the CPU 111.

In step S6301, the interrupt adjustment execution unit 310 reads gradation correction targets corresponding to the sheet(s) on which the interrupt adjustment chart is printed from the page image control unit 303.

In step S6302, the interrupt adjustment execution unit 310 reads the measurement result (color measurement values) of the gradation patches measured by the sensors 220, received in step S6013. In step S6303, the interrupt adjustment execution unit 310 calculates differences between the gradation correction targets and the color measurement values.

In step S6304, the interrupt adjustment execution unit 310 generates a new gradation correction table from the calculated differences.

In such a manner, a new gradation correction table is generated each time an interrupt occurs and an interrupt adjustment chart is output. As described above, the new gradation correction table to be generated may be changed depending on the color configuration of the gradation patches measured in step S6013. In the present exemplary embodiment, a gradation correction table for all the four colors is generated if the interrupt adjustment chart has a four-color configuration. A gradation correction table for black is generated if the interrupt adjustment chart has a monochrome configuration.

Referring back to the flowchart of FIG. 6, in step S6015, the interrupt adjustment execution unit 310 updates the gradation correction table with the new generated gradation correction table, and stores the updated gradation correction table. In step S6016, the interrupt adjustment chart print control unit 309 clears the interrupt adjustment counter information. The processing proceeds to step S6007 to continue the above-described processing.

As described above, by executing this flowchart, an interrupt adjustment chart corresponding to the color mode, sheet type, and sheet size based on instructions from the image processing apparatus 20 is generated and printed each time the number of printed pages reaches the set interrupt adjustment interval while a print job is printed with the interrupt adjustment setting enabled. New gradation correction tables continue to be generated and updated based on the measurement values obtained by measuring the gradation patches printed on the interrupt adjustment chart. Since the updated gradation correction table starts to be applied at the print processing immediately after the update, stable output image quality can be achieved during the printing of the print job.

As described above, according to the present exemplary embodiment, the printing system that prints an adjustment chart during execution of a print job and applies the result of measurement obtained by measuring patch densities of the adjustment chart to the gradation correction processing generates and prints the adjustment chart using a color mode, sheet type, and sheet size based on the settings of the print job. As a result, optimum output image quality based on the settings of the print job can be achieved.

According to the present exemplary embodiment, an adjustment chart of appropriately set sheet type can be inserted in performing printing using a plurality of types of sheets.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-012777, filed Jan. 29, 2021, which is hereby incorporated by reference herein in its entirety.

What is claimed is:

1. An apparatus comprising:

a forming portion which forms an image on a sheet fed from a stage in accordance with execution of printing of a predetermined number of images based on a print job;

a measurement portion which reads the formed image and perform color measurement;

one or more processors; and one or more memories coupled to the one or more processors storing instructions that, when executed by the one or more processors, cause the one or more processors to function as:

a generation unit configured to generate data based on a result of the color measurement and a reference value, the reference value being a target information of a color having the color measurement; and a correction unit configured to perform a gradation correction to image data by using the generated data, wherein the sheet on which the image is formed is determined based on a setting of the print job.

2. The apparatus according to claim 1, wherein the print job includes settings about a plurality of types of sheets.

3. The apparatus according to claim 1, wherein the print job includes settings about a sheet type and a sheet size for each page.

4. The apparatus according to claim 1, wherein the print job includes a setting about a color mode for each page.

5. The apparatus according to claim 1, wherein the image includes a plurality of patch images with gradually changing color densities.

6. A method comprising:

forming an image on a sheet fed from a stage in response to execution of printing of a predetermined number of images based on a print job;

reading the formed image and performing color measurement;

generating data based on a result of the color measurement and a reference value, the reference value being a target information of a color having the color measurement; and performing a gradation correction to image data by using the generated data, wherein the sheet on which the image is formed is determined based on a setting of the print job.

7. The method according to claim 6, wherein the print job includes settings about a plurality of types of sheets.

8. The method according to claim 6, wherein the print job includes settings about a sheet type and a sheet size for each page.

9. The method according to claim 6, wherein the print job includes a setting about a color mode for each page.

10. The method according to claim 6, wherein the image includes a plurality of patch images with gradually changing color densities.

11. A non-transitory computer-readable storage medium storing a computer program for causing a computer to perform a method, the method comprising:

forming an image on a sheet fed from a stage in response to execution of printing of a predetermined number of images based on a print job;

reading the formed image and performing color measurement;

generating data based on a result of the color measurement and a reference value, the reference value being a target information of a color having the color measurement; and performing a gradation correction to image data by using the generated data, wherein the sheet on which the image is formed is determined based on a setting of the print job.

12. The non-transitory computer-readable storage med according to claim 11, wherein the print job includes settings about a plurality of types of sheets.

13. The non-transitory computer-readable storage med according to claim 11, wherein the print job includes settings about a sheet type and a sheet size for each page.

14. The non-transitory computer-readable storage med according to claim 11, wherein the print job includes a setting about a color mode for each page.

15. The non-transitory computer-readable storage med according to claim 11, wherein the image includes a plurality of patch images with gradually changing color densities.

* * * * *